(12) United States Patent
Walsh et al.

(10) Patent No.: US 11,887,102 B1
(45) Date of Patent: Jan. 30, 2024

(54) TEMPORARY VIRTUAL PAYMENT CARD

(71) Applicant: Block, Inc., San Francisco, CA (US)

(72) Inventors: Conor Walsh, Oakland, CA (US);
Michael Bain, Melbourne (AU);
Alexander Szlavik, Waterloo (CA)

(73) Assignee: Block, Inc., San Francisco, CA (US)

( * ) Notice: Subject to any disclaimer, the term of this patent is extended or adjusted under 35 U.S.C. 154(b) by 133 days.

(21) Appl. No.: 16/528,601

(22) Filed: Jul. 31, 2019

(51) Int. Cl.
G06Q 20/34 (2012.01)
G06Q 20/38 (2012.01)

(52) U.S. Cl.
CPC ......... *G06Q 20/348* (2013.01); *G06Q 20/351* (2013.01); *G06Q 20/382* (2013.01)

(58) Field of Classification Search
CPC ... G06Q 20/348; G06Q 20/351; G06Q 20/382
USPC .......................................................... 705/44
See application file for complete search history.

(56) References Cited

U.S. PATENT DOCUMENTS

| | | |
|---|---|---|
| 4,764,666 A | 8/1988 | Bergeron |
| 5,221,838 A | 6/1993 | Gutman et al. |
| 5,892,900 A | 4/1999 | Ginter et al. |
| 5,999,941 A | 12/1999 | Andersen |
| 6,144,948 A | 11/2000 | Walker et al. |
| 6,315,196 B1 | 11/2001 | Bachman |
| 6,601,049 B1 | 7/2003 | Cooper |
| 6,786,400 B1 | 9/2004 | Bucci |
| 6,999,943 B1* | 2/2006 | Johnson ............... G06Q 40/025 705/37 |
| 7,249,093 B1 | 7/2007 | King |
| 7,433,499 B2 | 10/2008 | Kim |
| 7,552,087 B2 | 6/2009 | Schultz et al. |
| 7,693,745 B1 | 4/2010 | Pomerantz et al. |

(Continued)

FOREIGN PATENT DOCUMENTS

| | | |
|---|---|---|
| WO | 01/59597 A1 | 8/2001 |
| WO | 2007/008686 A2 | 1/2007 |

(Continued)

OTHER PUBLICATIONS

Non Final office Action dated Jun. 15, 2018, for U.S. Appl. No. 15/721,212, of Omojola, A., et al., filed Sep. 29, 2017.

(Continued)

*Primary Examiner* — Jessica Lemieux
*Assistant Examiner* — Merritt J Hasbrouck
(74) *Attorney, Agent, or Firm* — Baker Botts L.L.P.

(57) ABSTRACT

In one embodiment, a method includes, by one or more computing devices associated with a payment service (PS), assigning a first payment card number of a first plurality of payment card numbers to an account of a user, wherein the first plurality of payment card numbers is issued from a first issuer processor. The PS detecting an event affecting the use of the first payment card in a transaction. The PS, in response to detecting the event, accessing a second plurality of payment card numbers issued from a second issuer processor and assigning a second payment card number of the second plurality of payment card numbers to the account of the user. The PS receiving an indication that a status of the event has changed. The PS, in response to receiving the indication, automatically enabling, the first payment card number for use in transactions for the account of the user.

20 Claims, 11 Drawing Sheets

(56) References Cited

U.S. PATENT DOCUMENTS

| | | | |
|---|---|---|---|
| 7,774,209 B2 | 8/2010 | James et al. |
| 7,827,108 B2 | 11/2010 | Perlman et al. |
| 8,041,640 B2 | 10/2011 | Stone |
| 8,255,278 B1 | 8/2012 | Young et al. |
| 8,260,694 B1 | 9/2012 | Lauer et al. |
| 8,555,077 B2 | 10/2013 | Davis et al. |
| 8,561,894 B1 | 10/2013 | Mullen et al. |
| 8,602,297 B2 | 12/2013 | Wilen |
| 8,612,317 B1 | 12/2013 | Harman et al. |
| 9,082,119 B2 | 7/2015 | Ortiz et al. |
| 9,246,903 B2 | 1/2016 | Adenuga |
| 9,361,615 B1 | 6/2016 | Clemence et al. |
| 9,811,810 B1 | 11/2017 | Ranganath et al. |
| 9,836,736 B1 | 12/2017 | Neale et al. |
| 9,875,385 B1 | 1/2018 | Humphreys et al. |
| 10,157,397 B2 | 12/2018 | Walz |
| 10,210,569 B1 | 2/2019 | Kim et al. |
| 10,270,587 B1 | 4/2019 | Wu |
| 10,380,564 B1 | 8/2019 | Wilson et al. |
| 10,453,056 B2 | 10/2019 | Grassadonia et al. |
| 10,467,601 B1 | 11/2019 | Bricca et al. |
| 10,681,133 B2 | 6/2020 | Puleston et al. |
| 10,740,735 B2 | 8/2020 | Malhotra et al. |
| 2002/0198806 A1 | 12/2002 | Blagg et al. |
| 2003/0028481 A1 | 2/2003 | Flitcroft et al. |
| 2003/0033582 A1 | 2/2003 | Klein et al. |
| 2004/0140897 A1 | 7/2004 | Fabre et al. |
| 2005/0116027 A1 | 6/2005 | Algiene et al. |
| 2005/0116028 A1 | 6/2005 | Cohen et al. |
| 2005/0194452 A1 | 9/2005 | Nordentoft et al. |
| 2006/0006223 A1 | 1/2006 | Harris |
| 2006/0016877 A1 | 1/2006 | Bonalle et al. |
| 2006/0253340 A1 | 11/2006 | Levchin et al. |
| 2006/0277271 A1 | 12/2006 | Morse et al. |
| 2007/0050258 A1 | 3/2007 | Dohse |
| 2007/0131759 A1 | 6/2007 | Cox et al. |
| 2008/0120218 A1 | 5/2008 | Reid et al. |
| 2008/0218356 A1 | 9/2008 | Frew et al. |
| 2008/0301049 A1 | 12/2008 | Dyson |
| 2009/0114716 A1 | 5/2009 | Ramachandran |
| 2009/0164370 A1 | 6/2009 | Sorbe et al. |
| 2009/0271278 A1 | 10/2009 | Bishop et al. |
| 2009/0287564 A1 | 11/2009 | Bishop et al. |
| 2009/0287565 A1 | 11/2009 | Bishop et al. |
| 2009/0289106 A1 | 11/2009 | Bishop et al. |
| 2009/0299841 A1 | 12/2009 | Bishop et al. |
| 2010/0030698 A1 | 2/2010 | Goodin |
| 2011/0035320 A1 | 2/2011 | Perlman et al. |
| 2011/0251892 A1 | 10/2011 | Laracey |
| 2012/0078735 A1 | 3/2012 | Bauer |
| 2012/0084135 A1 | 4/2012 | Nissan et al. |
| 2012/0233015 A1 | 9/2012 | Calman et al. |
| 2012/0253913 A1 | 10/2012 | Richard |
| 2012/0290609 A1 | 11/2012 | Britt |
| 2012/0296818 A1 | 11/2012 | Nuzzi et al. |
| 2013/0024361 A1 | 1/2013 | Choudhuri et al. |
| 2013/0024364 A1 | 1/2013 | Shrivastava et al. |
| 2013/0024371 A1* | 1/2013 | Hariramani .......... G06Q 20/384 |
| | | 705/41 |
| 2013/0085860 A1 | 4/2013 | Summers et al. |
| 2013/0103581 A1 | 4/2013 | Barry et al. |
| 2013/0103760 A1 | 4/2013 | Golding et al. |
| 2013/0110658 A1 | 5/2013 | Lyman et al. |
| 2013/0117155 A1 | 5/2013 | Glasgo |
| 2013/0132140 A1 | 5/2013 | Amin et al. |
| 2013/0132246 A1 | 5/2013 | Amin et al. |
| 2013/0132274 A1 | 5/2013 | Henderson et al. |
| 2013/0132887 A1 | 5/2013 | Amin et al. |
| 2013/0138500 A1 | 5/2013 | Charaniya et al. |
| 2013/0138519 A1 | 5/2013 | McKenzie |
| 2013/0144674 A1 | 6/2013 | Kim et al. |
| 2013/0144702 A1 | 6/2013 | Tabor et al. |
| 2013/0144783 A1 | 6/2013 | Bishop |
| 2013/0151358 A1 | 6/2013 | Ramalingam |
| 2013/0151419 A1 | 6/2013 | Hitchcock et al. |
| 2013/0159086 A1 | 6/2013 | Richard |
| 2013/0185208 A1 | 7/2013 | Aaron et al. |
| 2013/0191199 A1 | 7/2013 | Corner |
| 2013/0198075 A1 | 8/2013 | Sakata et al. |
| 2013/0198076 A1 | 8/2013 | Zambelli Hosmer et al. |
| 2013/0218683 A1 | 8/2013 | Hannan |
| 2013/0246207 A1 | 9/2013 | Novak et al. |
| 2013/0246301 A1 | 9/2013 | Radhakrishnan et al. |
| 2013/0282490 A1 | 10/2013 | Kramer et al. |
| 2014/0019236 A1 | 1/2014 | Argue et al. |
| 2014/0058861 A1 | 2/2014 | Argue et al. |
| 2014/0108173 A1 | 4/2014 | Cooper et al. |
| 2014/0114857 A1 | 4/2014 | Griggs et al. |
| 2014/0122340 A1* | 5/2014 | Flitcroft .................. G06Q 40/04 |
| | | 705/44 |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0156531 A1 | 6/2014 | Poon et al. |
| 2014/0229305 A1 | 8/2014 | Ellan |
| 2014/0278609 A1 | 9/2014 | Capps et al. |
| 2014/0279106 A1 | 9/2014 | Smelcer |
| 2014/0310182 A1 | 10/2014 | Cummins |
| 2015/0031393 A1 | 1/2015 | Post et al. |
| 2015/0046307 A1 | 2/2015 | Calman et al. |
| 2015/0046339 A1 | 2/2015 | Wong et al. |
| 2015/0106243 A1 | 4/2015 | Blackhurst et al. |
| 2015/0120509 A1 | 4/2015 | Moring et al. |
| 2015/0120529 A1 | 4/2015 | Faaborg |
| 2015/0170014 A1* | 6/2015 | Olson .................. G06Q 20/341 |
| | | 235/380 |
| 2015/0213426 A1 | 7/2015 | Singhal |
| 2015/0310419 A1 | 10/2015 | Kadaster et al. |
| 2015/0332140 A1 | 11/2015 | Kawano et al. |
| 2015/0332223 A1 | 11/2015 | Aaron et al. |
| 2015/0332247 A1 | 11/2015 | Winfield et al. |
| 2015/0339648 A1 | 11/2015 | Kushevsky et al. |
| 2015/0371219 A1 | 12/2015 | Ljujic |
| 2016/0063484 A1 | 3/2016 | Carpenter et al. |
| 2016/0189142 A1 | 6/2016 | Chandru et al. |
| 2016/0275486 A1 | 9/2016 | Liu et al. |
| 2016/0321705 A1 | 11/2016 | Scheidelman |
| 2017/0178113 A1 | 6/2017 | Mugford et al. |
| 2018/0096340 A1 | 4/2018 | Omojola et al. |
| 2018/0114212 A1* | 4/2018 | Beck .................. G06Q 20/4016 |
| 2018/0150823 A1 | 5/2018 | Omojola et al. |
| 2019/0057373 A1 | 2/2019 | Van Veelen |
| 2020/0134611 A1 | 4/2020 | Grassadonia et al. |
| 2020/0394641 A1 | 12/2020 | Omojola et al. |
| 2021/0019729 A1 | 1/2021 | Omojola et al. |

FOREIGN PATENT DOCUMENTS

| | | |
|---|---|---|
| WO | 2016/033165 A1 | 3/2016 |
| WO | 2018/063809 A1 | 4/2018 |
| WO | 2019005968 A1 | 1/2019 |

OTHER PUBLICATIONS

Final Office Action dated Nov. 15, 2018, for U.S. Appl. No. 15/721,212, of Omojola, A., et al., filed Sep. 29, 2017.

Non-Final Office Action dated Jun. 27, 2019, for U.S. Appl. No. 15/282,759, of Omojola, A., et al., filed Sep. 30, 2016.

Non-Final Office Action dated Nov. 27, 2019, for U.S. Appl. No. 15/721,212, of Omojola, A., et al., filed Sep. 29, 2017.

Ex Parte Quayle Action dated Jan. 10, 2020 for U.S. Appl. No. 15/282,759, filed Sep. 30, 2016.

Notice of Allowance dated Apr. 3, 2020 for U.S. Appl. No. 15/282,759, filed Sep. 30, 2016.

Final Office Action dated Apr. 9, 2020, for U.S. Appl. No. 15/721,212, of Omojola, A., et al., filed Sep. 29, 2017.

Office Action received for EP Application No. 17772242.8, dated Jan. 21, 2020.

Examination Report received for Australian Patent Application No. 2017335581, dated Apr. 30, 2020.

Examiner Requisition received for Canadian Patent Application No. 3,037,671, dated May 12, 2020.

(56) References Cited

OTHER PUBLICATIONS

International Search Report and Written Opinion for International Application No. PCT/US2017/051468, dated Nov. 22, 2017.
Non-Final Office Action dated Dec. 12, 2019, for U.S. Appl. No. 15/941,909, of Bricca, G., et al., filed Mar. 30, 2018.
Final Office Action dated Jan. 27, 2020, for U.S. Appl. No. 15/476,604, of Grassadonia, B., et al., filed Mar. 31, 2017.
Advisory Action dated Mar. 26, 2020, for U.S. Appl. No. 15/476,604, of Grassadonia, B., et al., filed Mar. 31, 2017.
Non-Final Office Action dated Apr. 1, 2020, for U.S. Appl. No. 14/453,526, of Jowdy, J.M., filed Aug. 6, 2014.
Non-Final Office Action dated Nov. 23, 2020, for U.S. Appl. No. 16/925,209, of Omojola, A., et al., filed Jul. 9, 2020.
"Activating vs. Registering Credit Cards," Discover, Retrieved from the Internet URL: https://www.discover.com/credit-cards/resources/registering-credit-cards, pp. 1-5 (May 25, 2018).
Hamm, T., "10 Simple Ways To Beat Impulse Buying," The Simple Dollar, Retrieved from the Internet URL: https://www.thesimpledollar.com/10-simple-ways-to-beat-impulse-buying/, pp. 1-9 (Sep. 22, 2014).
Mirembe, D.P., et al., "A Model for Electronic Money Transfer for Low Resourced Environments: M-Cash," Third International Conference on Broadband Communications, Information Technology.
Warnick, M., "Think You can't use that your not yet activated credit card? Think Again," Sticker, dated Sep. 23, 2009, Retrieved from Internet URL: http://www.creditcards.com/credit-card-news/sticker-activate-new-credit-card-1282.php, on Aug. 30, 2017, pp. 1-6.
Non-Final Office Action dated Jan. 15, 2015, for U.S. Appl. No. 14/098,336, of Wilson, M., et al., filed Dec. 5, 2013.
Non-Final Office Action dated Sep. 10, 2015, for U.S. Appl. No. 14/098,336, of Wilson, M., et al., filed Dec. 5, 2013.
Non-Final Office Action dated Mar. 24, 2016, for U.S. Appl. No. 14/098,336, of Wilson, M., et al., filed Dec. 5, 2013.
Non-Final Office Action dated Sep. 9, 2016, for U.S. Appl. No. 14/098,336, of Wilson, M., et al., filed Dec. 5, 2013.
Final Office Action dated Feb. 24, 2017, for U.S. Appl. No. 14/098,336, of Wilson, M., et al., filed Dec. 5, 2013.
Non-Final Office Action dated Sep. 27, 2017, for U.S. Appl. No. 14/098,336, of Wilson, M., et al., filed Dec. 5, 2013.
Non-Final Office Action dated Nov. 2, 2017, for U.S. Appl. No. 14/453,526, of Jowdy, J., M., filed Aug. 6, 2014.
Non-Final Office Action dated Nov. 15, 2017, for U.S. Appl. No. 15/640,321, of Grassadonia, B., et al., filed Jun. 30, 2017.
Non-Final Office Action dated Mar. 9, 2018, for U.S. Appl. No. 14/747,805, of Kim, W., et al., filed Jun. 23, 2015.
Final Office Action dated Jun. 1, 2018, for U.S. Appl. No. 14/453,526, of Jowdy, J.M., filed Aug. 6, 2014.
Final Office Action dated Jun. 4, 2018, for U.S. Appl. No. 15/640,321, of Grassadonia, B., et al., filed Jun. 30, 2017.
Final Office Action dated Jun. 18, 2018, for U.S. Appl. No. 14/098,336, of Wilson, M., et al., filed Dec. 5, 2013.
Non-Final Office Action dated Aug. 10, 2018, for U.S. Appl. No. 15/941,797, of Bricca, G., et al., filed Mar. 30, 2018.
Notice of Allowance dated Sep. 20, 2018, for U.S. Appl. No. 14/747,805, of Kim, W., et al., filed Jun. 23, 2015.
Advisory Action dated Oct. 26, 2018, for U.S. Appl. No. 14/098,336, of Wilson, M., et al., filed Dec. 5, 2013.
Non Final Office Action dated Jan. 14, 2019, for U.S. Appl. No. 15/640,321, of Grassadonia, B., et al., filed Jun. 30, 2017.
Non-Final Office Action dated Jan. 28, 2019, for U.S. Appl. No. 14/453,526, of Jowdy, J.M., filed Aug. 6, 2014.
Final Office Action dated Mar. 22, 2019, for U.S. Appl. No. 15/941,797, of Bricca, G., et al. filed Mar. 30, 2018.
Notice of Allowance dated Apr. 1, 2019, for U.S. Appl. No. 14/098,336, of Wilson, M. et al., filed Dec. 5, 2013.
Notice of Allowance dated May 17, 2019, for U.S. Appl. No. 14/098,336, of Wilson, M., et al., filed Dec. 5, 2013.
Notice of Allowance dated Jun. 12, 2019, for U.S. Appl. No. 15/640,321, of Grassadonia, B., et al., filed Jun. 30, 2017.
Notice of Allowance dated Jun. 19, 2019, for U.S. Appl. No. 15/941,797, of Bricca, G., et al., filed Mar. 30, 2018.
Final Office Action dated Aug. 8, 2019, for U.S. Appl. No. 14/453,526, of Jowdy, J.M., filed Aug. 6, 2014.
Non-Final Office Action dated Aug. 12, 2019, for U.S. Appl. No. 15/476,604, of Grassadonia, B., et al., filed Mar. 31, 2017.
International Search Report and Written Opinion for International Application No. PCT/US2018/039756, dated Nov. 15, 2018.
Final Office Action dated Jul. 10, 2020, for U.S. Appl. No. 15/941,909, of Bricca, G., et al., filed Mar. 30, 2018.
Examination Report No. 2 received for Australian Patent Application No. 2017335581, dated Dec. 11, 2020.
Notice of Allowance dated Mar. 17, 2021, for U.S. Appl. No. 17/065,240, of Omojola, A., et al., filed Oct. 7, 2020.
Supplemental Notice of Allowability dated Mar. 29, 2021, for U.S. Appl. No. 17/065,240, of Omojola, A., et al., filed Oct. 7, 2020.
Advisory Action dated Apr. 5, 2021, for U.S. Appl. No. 16/925,209, of Omojola, A., et al., filed Jul. 9, 2020.
Examination Report No. 3 received for Australian Patent Application No. 2017335581, dated Apr. 16, 2021.
Final Office Action dated Feb. 24, 2021, for U.S. Appl. No. 16/925,209, of Omojola, A., et al., filed Jul. 9, 2020.
Examiner Requisition received for Canadian Patent Application No. 3,037,671, dated Jan. 27, 2021.
Final Office Action dated Apr. 19, 2022, for U.S. Appl. No. 17/191,646, of Omojola, A., et al., filed Mar. 3, 2021.
Notice of Allowance dated May 9, 2022, for U.S. Appl. No. 16/925,209, of Omojola, A., et al., filed Jul. 9, 2020.
Examination Report No. 1 received for Australian Patent Application No. 2021202683, dated Apr. 27, 2022.
Final Office Action dated Sep. 20, 2021, for U.S. Appl. No. 17/191,646, of Omojola, A., et al., filed Mar. 3, 2021.
Non Final Office Action dated Sep. 27, 2021, for U.S. Appl. No. 16/925,209, of Omojola, A., et al., filed Jul. 9, 2020.
Final Office Action dated Dec. 10, 2021, for U.S. Appl. No. 16/925,209, of Omojola, A., et al., filed Jul. 9, 2020.
Examiner Requisition received for Canadian Patent Application No. 3,037,671, dated Oct. 7, 2021.
Office Action received for EP Application No. 17772242.8, dated Nov. 9, 2021.
Narendra, L., "Bloom filter for System Design | Bloom filter applications | learn bloom filter easily", dated Sep. 10, 2018, Retrieved from the Internet URL: https://www.youtube.com/watch?v=Bay3X9PAX5k, 36 pages.
Advisory Action dated Feb. 4, 2022, for U.S. Appl. No. 16/925,209, of Omojola, A., et al., filed Jul. 9, 2020.
Non-Final Office Action dated Feb. 18, 2022, for U.S. Appl. No. 17/191,646, of Omojola, A., et al., filed Mar. 3, 2021.
Advisory Action dated Jun. 9, 2022, for U.S. Appl. No. 17/191,646, of Omojola, A., et al., filed Mar. 3, 2021.
Non-Final Office Action dated Aug. 9, 2022, for U.S. Appl. No. 17/191,646, of Omojola, A., et al., filed Mar. 3, 2021.
Examination Report No. 2 received for Australian Patent Application No. 2021202683, dated Sep. 21, 2022.
Examiner Requisition for Canadian Patent Application No. 3,037,671, dated Jul. 12, 2022.

\* cited by examiner

TEMPORARY VIRTUAL PAYMENT CARD

BACKGROUND

Use of a payment card number associated with a payment service system may provide easy access to user funds for various transactions. These user funds are generally always available to a user. However, there are some instances when an event may occur that affects the use of the payment card numbers for transactions. These events may render a user's access to his or her funds impossible. Therefore, an alternative to access the user funds is required to maintain user access to his or her funds.

DESCRIPTION OF EXAMPLE EMBODIMENTS

Figure 1A:
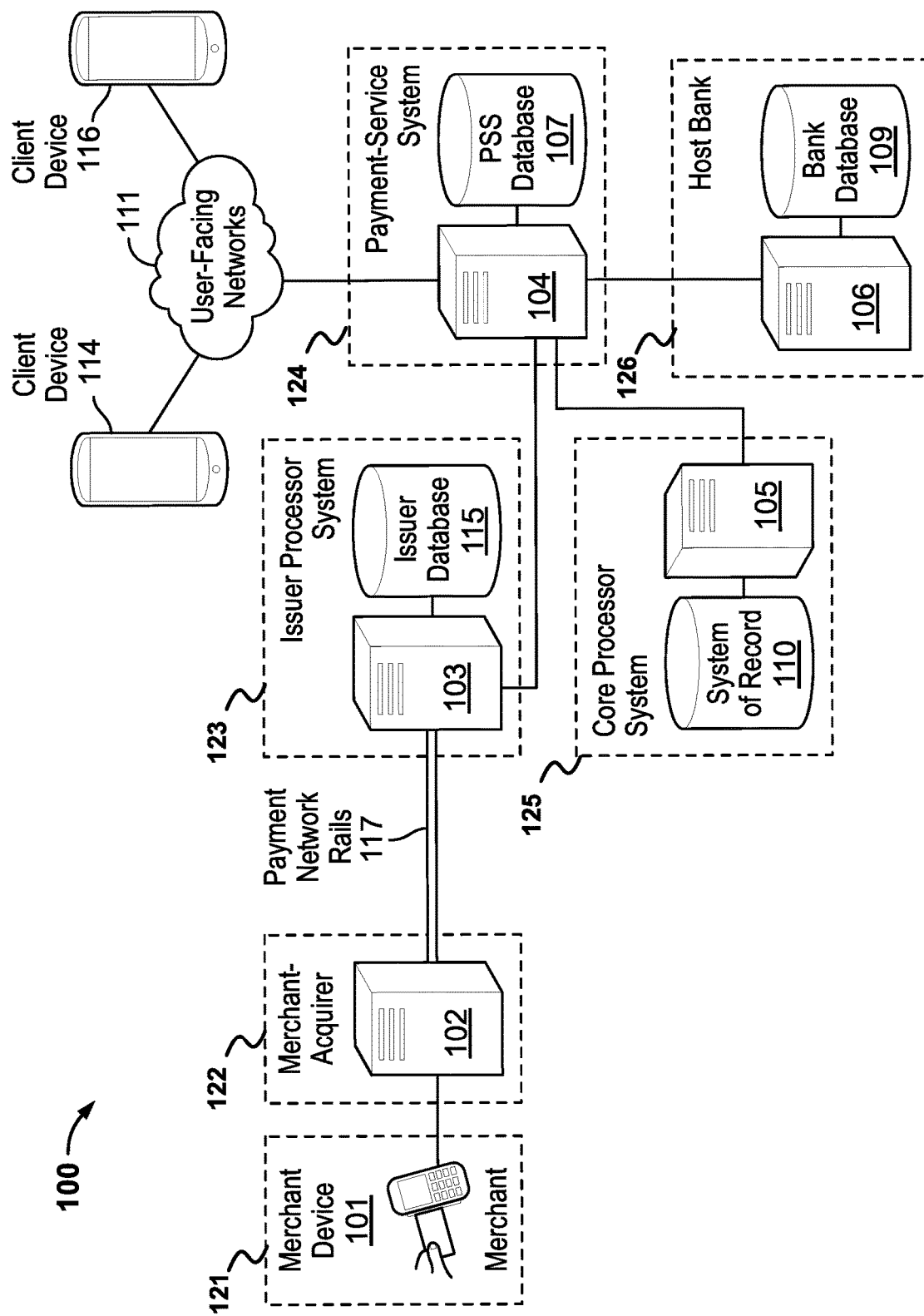
FIG. 1A illustrates an example of a payment service system network.

Particular embodiments described herein may enable management of temporary virtual payment card numbers through a payment service system and payment transactions using the temporary virtual payment card number. The payment service system may enable a user to access an account balance associated with the user's account through a temporary virtual payment card number. The payment service system may improve the access to a user's account through a temporary virtual payment card number in the instance an event affecting the use of another payment card number associated with the user's account. The payment service system may allow for customization of the user's account through the use of a temporary virtual payment card number. Through the use of the temporary virtual payment card number, the user may be provided a more seamless experience instead of receiving error messages of a failed transactions using the user's payment card number.

To date, an event that affects the use of a payment card number of a user's account may prevent the user from using funds in the account. For instance, if the user has $100 in the account to use and an outage were to occur with an issuer processor associated with the payment card number on the account, then the user may not be able to use the funds even if the user has enough for a transaction. This proves problematic when the user needs to access his or her funds immediately. As such, it is necessary to provide the user with access to his or her funds despite an event affecting usage of the user's payment card number.

In particular embodiments, a payment service system may assign a temporary payment card number for the user to use and access the funds on the user's account. The user may have an account that is managed by the payment service system. The payment service system may initially assign a payment card number for the user to use and access funds on his or her account. However, in an event that disrupts the usage of the assigned payment card number, the payment service system may assign a new temporary payment card number for the user to access his or her funds. The temporary payment card number may be a virtual payment card number so the user would not need to have a physical card for payments. For use at various merchants, the user may use the temporary payment card number through input of specific card number associated with the temporary payment card, a wireless payment (e.g., NFC), or the like. In one example, the payment service may map the temporary payment card number to the previous payment card number (e.g., card experiencing outage) so that the physical card can still be used with the temporary payment card number.

In particular embodiments, the payment service system maintains the transaction history of a temporary payment card number used by the user. The user may initially start with a preset balance (e.g., $100), a predicted balance based on an average historical balance associated with the user, or suggested balance based on a last known balance prior to disruption of the payment card number When the user performs multiple transactions with the temporary payment card number, the payment service system may track the transactions and update the balance accordingly. When usage is restored to the original payment card number associated with the user's account, the payment service system may send updates to the corresponding banks associated with each of the payment card numbers (e.g., both original and temporary). As an example and not by way of limitation, each payment card number may be associated with its own different issuer processor system and its own host bank. As such, each issuer processor may handle transactions of the payment card number that are associated with the respective issuer processor. The payment service system may update the balance of users' account subsequently after an event is resolved (e.g., usage of payment card numbers is restored) and send the updated balance to the corresponding issuer processor system and bank. That is, the issuer processor system and bank may transfer funds to another issuer processor system and bank if necessary.

Examples of the present payment service system provide improvements over prior systems. For example, there may be an improvement in how the payment processing system functions by enabling a transaction to be processed even when network connectivity to a specific banking server is unavailable. As another example, the automatic disabling of a payment card number helps to improve network bandwidth of payment service systems by reducing the number of decline messages caused through multiple attempts of using an unavailable card number.

FIG. 1A illustrates an example of a payment service system network 100. The payment service system network 100 may include several servers that handle various steps in a computerized system for tracking debit and credit transactions. In particular embodiments, the payment service system network 100 may comprise a plurality of entity systems associated and operated by various entities of the payment service system network 100, including a merchant 121, a merchant-acquirer 122, an issuer processor 123, a payment service system 124, host banking system 126 working in collaboration with the payment service system 124 to provide user-oriented services, and core processor system 125. In particular embodiments, each of the example entity systems may comprise electronic devices (e.g., merchant computing devices 101, server computers 102, 103, 104, 105, 106) that execute the various processes described herein and networking devices that facilitate intercommunications between the various entities 121, 122, 123, 124, 125, 126. In particular embodiments the payment service system network 100 may comprise additional or alternative entity systems, and some embodiment may omit or combine certain entity systems of the example payment service system network 100 shown in FIG. 1A.

In particular embodiments, a merchant computing device 101 may be employed by a merchant 121 to request payment authorization for a particular transaction. The merchant computing device 101 may be any device capable of capturing payment request data from various types of payment instruments, and then transmitting payment authorization requests containing the request data to various components of the payment service system network 100. As an example and not by way of limitation, a merchant computing device 101 may include a point of sale (POS) terminal, a credit card payment processing terminal (e.g., a credit card scanner), and a cash register. As an example and not by way of limitation, payment instruments may include magnetic stripe cards, EMV cards, and virtual cards that may be stored on a client device 114. As mentioned, the merchant computing device 101 may comprise or may be coupled to various types of instrument readers configured to capture transaction data from certain types of payment instruments. As an example and not by way of limitation, if the payment instrument is a virtual card (e.g., cryptographic token) stored on a client device 114, and the client device 114 is configured to transmit payment request data for the virtual card using near field communications (NFC), then the merchant computing device 101 may comprise or may be coupled to an NFC scanner configured to capture the transaction data related to the virtual card via the NFC signal received from the client device 114.

In particular embodiments, in operation, a merchant computing device 101 may capture payment transaction data, such as a card identifier (CID) or payment card number, and then transmit the payment transaction data to a merchant-acquirer server 102. The merchant computing device 101 may be configured to generate digital messages containing the payment authorization request and transaction data, which, in some embodiments may be generated according to particular protocols or specifications. As an example and not by way of limitation, the merchant computing device 101 may generate a payment authorization request according to one or more ISO standards in which the payment authorization request contains certain fields of payment transaction data. As an example and not by way of limitation, data fields that may be included the digital message may include a merchant identifier (merchant ID), a merchant category code (MCC), an amount for the transaction, a timestamp (e.g., data, time), and a card number. In particular embodiments, the merchant computing device 101 may transmit the digital message containing the card and/or other payment information to a merchant-acquirer server 102, although in some implementations the digital message may be transmitted to other devices, such as an issuer processor server 103 of an issuer processor system 123.

In particular embodiments, merchant-acquirers 122 may be financial institutions that process credit or debit card payments on behalf of a merchant 121. A merchant-acquirer 122 may be configured to receive payments from banks 126 that issue payment cards within a payment network entity (also referred to as a payment network association entity). A merchant-acquirer server 102 may be any computing device configured to communicate, over predetermined payment network rails 117, digital messages containing payment transaction data to and from one or more merchant computing devices 101, as well as transaction data to and from the issuer processor server 103. In particular embodiments, in operation, the merchant-acquirer server 102 may perform one or more processes on the digital message, and forward at least some of the payment transaction data collected by the merchant computing device 101 to the issuer processor server 103 over the payment network rails 117 of a particular payment network entity. In some implementations, the merchant-acquirer server 102 may forward to the merchant computing device 101 payment authorization response messages from the issuer processor server 103, indicating whether the payment was authorized, interrupted, or declined.

In particular embodiments, in operation, the merchant computing device 101 may capture payment card information and then generate and transmit a digital message, such as a payment authorization request, comprising the payment card information along with transaction data (e.g., transaction amount, merchant identifier) to a merchant-acquirer server 102. The merchant computing device 101 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. As an example and not by way of limitation, data fields that may be included the digital message may include a merchant identifier (merchant ID), a merchant name, a merchant category code (MCC), an amount for the transaction, a timestamp (e.g., data, time), a token, and a card number. In particular embodiments, the merchant computing device 101 may transmit the digital message containing the card and/or other payment information to a merchant-acquirer server 102, although in some embodiments, the digital message may be transmitted to other devices, such as an issuer processor server 103 of an issuer processor system 123.

In particular embodiments, payment network entities may be entities that operate payment network rails 117, which may be a computing communications network configured to receive and transmit digital messages between and among merchant computing devices 101 and merchant-acquirer servers 102, as well as messages between merchant-acquirer servers 102 and issuer processor server 103. In particular embodiments, in operation, merchant computing devices 101 and merchant-acquirer servers 102 may generate, manipulate, and transmit digital messages containing payment transaction request messages and payment transaction data. The digital messages may be generated and manipulated according to the policies, standards, and protocols implemented by each particular payment network.

In particular embodiments, issuer processor systems 123 may establish payment card number records for customers, issue bills and statements, and process payments. The issuer processor server 103 may perform these functions and store transactions and payment card numbers in a storage device, such as an issuer database 115. Issuer processors 123 will typically forward payment authorization requests to a core processor server 105. However, the example system comprises a payment service system server 104 of a payment service system 124 positioned between issuer processor server 103 and core processor server 105. Furthermore, the payment service system server 104 may perform some or all of the functions typically associated with issuer processors 123, and therefore, in these embodiments, the merchant-acquirer server 102 can communicate over the payment network rails with the payment service system server 104. Although the issuer processor server 103 and the payment service system server 104 are shown as separate computing platforms, the issuer processor server 103 and the payment service system server 104 can be implemented as a single platform. The positioning of the payment service system server 104 between issuer processor server 103 and core processor server 105 allows the payment service system server 104 to provide added functionality to the system, such as intervene in, authorize, and record transactions in the payment stream (e.g., intercept payment authorizations, interrupt transactions, or decline transactions). As a result, the payment service system server 104 may also have access to all transactions associated with an account to provide further services to the client device 114 associated with the account.

In particular embodiments, the issuer processor server 103 may be configured to generate a cryptogram token for a payment card number, according to various predetermined algorithms and requirements associated with a digital wallet application executed by a client device 114. In particular embodiments, the issuer processor server 103 may generate a plurality of payment card numbers to be used in transactions and maintain the plurality of payment card numbers. The issuer processor server 103 may transmit a new payment card number to the payment service system server 104. In some instances, the token was generated to represent the payment card number, based on predetermined tokenization algorithms. However, the client device 114 may execute one or more digital wallet applications allowing the client device 114 to securely store payment card numbers and tokens and conduct payment transactions using the client device 114 instead of a physical payment card. The issuer processor server 103 may generate the cryptogram token for the payment card, using the payment card number and additional input parameters, and may transmit the cryptogram token directly or indirectly (through the payment service system server 104) to the client device 114 for storage and use in digital wallet-based transactions.

In particular embodiments, a host bank 126 may be a third-party financial institution that works in collaboration with the payment service system 124 to provide various services to users through consumer-facing applications. The host bank system 126 may have a bank server 106 and bank database 109. The bank server 106 may communicate with a payment service system server 104 via one or more networks and may be any computing device comprising a processor configured to execute the various processes and tasks described herein. In operation, the bank server 106 may generate new bank accounts and may interact with the payment service system 124, issuer processor system 123, and a core processor system 125 to debit or credit the various bank accounts managed by the host bank system 126. The host bank 126 may have a bank database 109 that may store banking data for various accounts, including routing numbers, account numbers, and account ledgers, among other types of information. The bank server 106 may generate and update records of the bank database 109 based on new and updated account information received from the various entities, according to account update requests and transaction data.

In particular embodiments, the payment service system 124 may have one or more accounts with the host bank 126 and user funds may be deposited into the account, where user-owned monies are tracked according to ledgers and user records or database account records in a payment service system database 107. In such embodiments, the bank server 106 may generate a routing number and account number for the payment service system 124, and various forms of information about the payment service system 124 and transactions may be tracked in the bank database 109. Users who use the payment service system services to facilitate payments or for other services may deposit funds into the account of the payment service system 124 held at the host bank 126. The payment service system server 104 may update a record of the user in the payment service system database 107 to reflect the amount of user money held in the payment service system account at the host bank 126. The bank server 106 may update the amount of money in the payment service system account reflected in the account data and ledgers stored in the bank database 109, based on various transaction request messages received from the payment service system server 104. The payment service system server 104 may similarly update the amount of money belonging to the user in the payment service system database 107, based on various transactions.

In particular embodiments, the host bank 126 may open and manage a financial account for each user registered in the payment-service-system database 107. In particular embodiments, the bank server 106 may receive instructions from the payment service system server 104 to open a new account for a user, when the user registers with the payment service system services, in response to some other trigger or instruction received from the payment service system server 104. The bank server 106 may execute one or more Know-Your-Customer (KYC) processes designed for collecting certain types of information about the user. In some cases, the bank server 106 or the payment service system server 104 may generate one or more graphical user interfaces (GUIs) configured to receive user information from the client device 114. And in some cases, the payment service system database 107 may contain the requisite KYC process data in a record of the user, which the payment service system server 104 may transmit to the bank server 106. The bank server 106 may generate one or more records for the user in bank databases 109, which may include generating a bank account number for the user. The bank server 106 may transmit the host bank account information for the user to the payment service system server 104, where the information may be stored into a record for the user in the payment service system database 107, identified by a user ID associated with the user.

In particular embodiments, a payment service system 124 ("payment service system") may comprise payment service system server 104. In particular embodiments, a payment service system server 104 may comprise a memory and a processor, whereby the memory comprises a set of computer-readable instructions that are executed by the processor. Although the payment service system server 104 is shown as a single server, it should be appreciated the functionality of a payment service system server 104 may be performed by computing devices. In the payment service system network 100, a payment service system server 104 may be coupled to issuer processor servers 103 and core processor servers 105, such that the payment service system server 104 may be situated between the issuer processor system 123 and the core processor system 125. As mentioned previously, it should be appreciated that in particular embodiments the payment service system server 104 may be configured to execute tasks and processes of an issuer processor server 103, such that the payment service system 124 may function as an issuer processor system 123. It should also be appreciated that in some embodiments the payment service system server 104 may additionally or alternatively be configured to perform various tasks and processes of a core processor server 105, such that the payment service system 124 may function as a core processor system 125.

In particular embodiments, the payment service system 124 may have one or more payment service system databases 107 that store records of users, account and transaction ledgers, and other forms of information. A payment service system database 107 may be hosted on the machine-readable storage of one or more computing devices, such as servers, laptops, and desktops, among other types of computing devices. The payment service system databases 107 may comprise or may otherwise be coupled to a payment service system server 104 via one or more internal networks, within the operational boundaries of payment service system network devices.

A payment service system database 107 may include a user account database that stores user profile records containing data fields for various types of data; non-limiting examples of information stored in records of the user account database may include user identifiers (user ID), user payment card numbers, transaction data, bank account data, and machine-readable tokens representing payment card numbers, among other types of information about users and user accounts. In particular embodiments, in operation, a payment service system server 104 may generate and update a user record according to registration or demographic data received from the client device 114 during a registration process, and according to transaction data received from the client device 114 or other entities of the system 100, such as the host bank 126, issuer processor 123, and core processor 125, among other entities, during other processes.

As an example of processes affecting a payment service system database 107 containing user information, in embodiments where the host bank 126 holds accounts for each individual user, during a registration process the payment service system server 104 may receive a new account request and various types of user information and client device data from a client application published by the payment service system 124 and executed by the client device 114. The payment service system server 104 may forward the request to a bank server 106 that may generate a new financial account for the user in the bank database 109, which may include generating and returning to the payment service system server 104 the routing number of the host bank 126 and a unique account number for the user's new financial account. The payment service system server 104 may store into the user record of the payment service system database 107, the data about the user, the data associated with the client application and/or the client device 114, and the data associated with new account held at the host bank 126. Alternatively, in embodiments where the host bank 126 manages accounts for the payment service system 124, during the registration process the payment service system server 104 may generate the user record in the payment service system database 107 and may update the user record to reflect amounts deposited or debited, into or out of the payment service system account held at the host bank. The payment service system server 104 may also receive data from the client device 114 and store it into the user profile record of the payment service system database 107, along with already-known data about the user, such as data associated with the client application or the client device 114.

As another example of a process affecting a payment service system database 107 that contains user information, the payment service system server 104 may receive a new card request from the client application executed by the client device 114, thereby prompting the payment service system server 104 to execute various processes for generating a new account for the user. The payment service system server 104 may retrieve a payment card number and store the payment card number into a user record of the payment service system database 107. In particular embodiments, the payment service system server 104 may execute a tokenization algorithm to generate a token that represents the payment card number, such that the token may operate as an alias or encoded representation of the payment card number. In such implementations, the payment service system server 104 may store the token into the payment service system database 107 records for the user and may then exchange the token with various devices of the system 100 during operational processes, allowing the devices to communicate transaction data using the token instead of transmitting the payment card number "openly" over the various computing networks. The payment service system server 104 may transmit the token and/or payment card number to the client device 114 for storage and later usage. In addition, the payment service system server 104 may transmit the payment card number to the issuer processor server 103, the bank server 106, and/or core processor server 105, or other computing device of entities that would require the payment card number generated for the user prior to any transactions being conducted using the payment card number.

In particular embodiments, a payment service system server 104 may communicate transaction data to a core processor server 105, which may record the payment authorization and other transaction data into a system of record database 110 and may further report the transaction data to the Federal Reserve and/or other entities that may be associated with the transaction. Although the core processor server 105 may transmit response messages indicating whether a transaction request associated with a user's payment card number should be authorized. The payment service system server 104 may make various determinations whether to confirm or otherwise authorize payments based on certain criteria, such as whether the transaction would cause an overdraft on the user account, whether the account is activated, the amount of the transaction, or the type of purchase (e.g., television v. lottery tickets). In some implementations, the payment service system server 104 may be configured to reject all transaction requests until a request to activate a payment card number has been received from an authorized client device 114 associated with the user. Conventional systems may take several days to activate a new payment card and payment card number. But unlike conventional payment systems, a payment service system server 104 may be situated between the host bank 126 and issuer processor 123, and thus the payment card numbers are capable of being activated and used in real-time, the moment the card number is generated. As such, the payment service system server 104 may transmit a useable card number to the client device 114, among other parties of the system 100. For the user's protection, because the payment card can be used when the payment card number is transmitted to the client device 114, the payment service system server 104 may reject all payment transactions requested by default. Likewise, the activation status of the payment card number in a user record in the payment service system database 107 may indicate that the card number has not been activated yet. The payment service system server 104 may prompt the user, via a client-side GUI presented on the client device 114, to activate the card. The activation request from the client device 114 may instruct the payment service system database 107 to update the activation status of the payment card number in the user profile or database account record to indicate the card has been activated, and thus the payment service system server 104 may authorize payment transactions satisfying any other criteria that might be verified by the payment service system server 104.

In particular embodiments, devices of the payment service system 124 may include, or may otherwise be coupled to, one or more user-facing networks 111, such as communication channels including the internet, SMS, or 3G-5G, through which client devices 114 of users may access the payment service system server 104 and payment service system databases 107. The user-facing networks 111 may comprise hardware and software computing-communications components configured to support communications between the client devices 114 and the payment service system server 104, where at least some of the networks 111 include internet protocol (IP) based networking technologies that allow the client devices 114 to communicate with the payment service system server 104. As an example and not by way of limitation, components of the user-facing networks 111 may include routers, switches, firewalls, and the like.

In particular embodiments, a core processor 125 may be a financial institution responsible for authorizing transactions, releasing funds, managing a system of record database 110, conducting various transactions and verifying identity. The core processor 125 entity may be a bank or a third party that provides software services to the bank allowing the bank to function as the core processor 125. Some financial institutions may maintain core processor servers 105 internal to the financial institution network boundaries. It should be appreciated that in some implementations the various entities may function as a core processor 125 entity. As an example and not by way of limitation, in some circumstances, the core processor 125 and the host bank 126 may be the same entity, and thus the computing devices may be the same devices.

In particular embodiments, a core processor server 105 receives and updates a system of record database 110 that can maintain accurate information of the account balances of an account. Transactions may be pending or in various stages of the payment stream, but the official recordation of those transactions is by the system of record database 110. Certain parties, such as the account owner, the merchant, the issuer processor, or the payment service system 124, may assume certain risks that an account holder does not have sufficient funds to fund a transaction, until the core processer server 105 authorizes the transaction and records the transaction in the system of record database 110.

In particular embodiments, in operation, when a payment service system server 104 receives a payment authorization request from a merchant computing device 101 via the various entities and devices, the payment service system server 104 may forward the associated transaction information to core processor server 105, which maintains an account corresponding to the payment card used in the payment transaction. The system of record database 110 may manage the account information using the core processor server 105, along with a ledger of transactions for the account and other user profile information. In some cases, the core processor server 105 may transmit account information, such as an indication for an amount of funds available to cover a transaction amount, to the payment service system server 104. The payment service system server 104 may determine based on preconfigured criteria whether to authorize the transaction based upon the account information received from the core processor server 105. As previously mentioned, in some embodiments, the payment service system server 104 may be configured to deny all transactions associated with a payment card number associated with a user profile in the payment service system database 107 until an activation request is received from the user via an authorized client device 114 associated with the user. The payment service system server 104 may be configured to make additional or alternative determinations regarding authorizing payment transaction requests independent of the core processor server 105 determinations and indications. For instance, the payment service system server 104 may reject transaction requests associated with the payment card number of the user when the payment service system server 104 determines that the payment card number is inactive, or there would be an overdraft on the account, even though the bank hosting the account of the user would permit the overdraft.

In particular embodiments, the payment service system server 104 may communicate transactions to the core processor server 105, which may update the system of record database 110 with transaction information associated with user accounts registered with the payment service system 124. The core processor server 105 may further report the transaction data and the daily ledger results in the system of record database 110 to the Federal Reserve and any other banks that maintain account records associated with the payment card used in payment authorizations and transactions. Depending on criteria, such as account activation status, the core processor server 105 may generate an authorization response that may be forwarded through the payment service system server 104 to various devices and entities of the system 100 (e.g., merchants 121, issuer processor 123, merchant-acquirer 122), to confirm how the merchant 121 may complete the payment transaction, indicating whether the transaction request was authorized or rejected by any particular entity in the payment authorization stream of the system 100.

In the conventional payment stream, an issuer processor 123 typically forwards payment authorization requests to a core processor server 105. However, according to embodiments described in the disclosure, such as the example payment service system network 100, and variations of such embodiments, a payment service system server 104 is situated between an issuer processor server 103 and a core processor server 105. Situating the payment service system server 104 between issuer processor server 103 and core processor server 105 allows for the payment service system server 104 to intervene in, authorize, and record transactions in the payment stream, such as payment authorizations. Consequently, the payment service system server 104 can have visibility into data generated for all transactions associated with a user's account and payment card number to provide additional services to the user using the account. As such, the payment service system server 104 may execute additional features and transaction processes that were not available in the conventional payment and financial systems.

Furthermore, the payment service system server 104 can perform some or all of the functions typically associated with issuer processors 123, and therefore, in some embodiments, the merchant-acquirer 122 may communicate directly with the payment service system server 104. In other words, some embodiments may facilitate collapsing the number of entities required to be involved in conventional payment transaction processing streams.

In particular embodiments, client devices 114 and 116 may be any computing devices capable of executing a locally-installed application or accessing a web-based application executed by a payment service system server 104. As an example and not by way of limitation, client devices may include a mobile phone, tablet, smart watch, personal data assistant, gaming console, and personal computer, among other computing devices. The client devices 114 and 116 may transmit various forms of device data with user data, during the registration, authorization, and verification processes. For example, during a registration process, the user may input into a registration GUI presented on the client device 114, demographic information associated with the user (e.g., name, date of birth, addresses, social security number). In addition, the client application may query a MAC address of the client device 114 and an IP address of the client device 114, as well as other types of information about the client device 114. The device data may be submitted with the user data during the registration process and may be stored in the user record in the payment service system database 107. As another example, a tokenization algorithm designed to mask the actual payment card number generated by the payment service system server 104 may use data inputs, such as the user ID of the user and/or a device identifier (device ID) associated with the client device 114; the device ID may be generated by the payment service system server 104 according to various input values, or the device ID may be an existing data field, such as the MAC address of the client device 114. As mentioned, the client device 114 may access and communicate with the payment service system server 104 over one or more user-facing networks 111 (e.g., the internet).

In particular embodiments, client devices 114 and 116 may communicate with one another to effect peer-to-peer (P2P) payment transactions between users. The client devices 114 and 116 may communicate with payment service system server 104 using payment requests, authentication requests, acceptance of payment requests, and confirmation of payments.

Figure 1B:
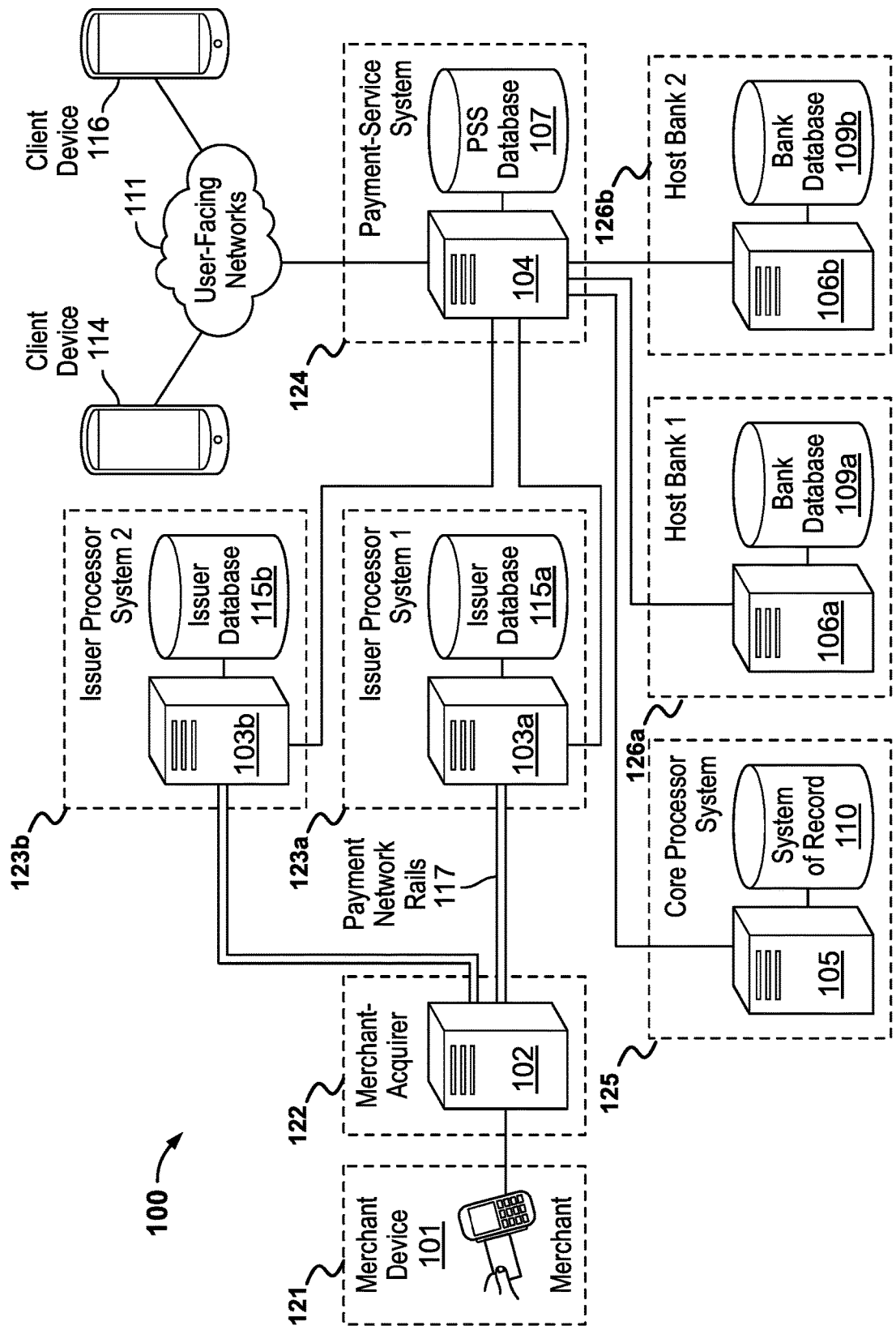
FIG. 1B illustrate another example payment service system network.

FIG. 1B illustrates another example of a payment service system network 100. Similarly to the payment service system network 100 shown in FIG. 1A, the payment service system network 100 in FIG. 1B may include several servers that handle various steps in a computerized system for tracking debit and credit transactions. However, the payment service system network 100 shown in FIG. 1B may include both an issuer processor system 1 123a and an additional issuer processor system 2 123b and a host bank 1 126a and an additional host bank 2 126b. In particular embodiments, the issuer processor system 1 123a may include an issuer processor server 103a and issuer database 115a. In particular embodiments, the issuer processor system 2 123b may include an issuer processor server 103b and issuer database 115b. The host bank 1 1126a may include a bank server 106a and a bank database 109a. The host bank 2 126b may include a bank server 106b and a bank database 109b. The issuer processor system 1 123a and the issuer processor system 2 123b may be two separate issuer processor systems. Similarly, host bank 1 126a may be separate from host bank 2 126b. The payment service system network 100 may include an additional issuer processor system 2 123b and an additional host bank 2 126b to provide another payment card number for the user to use for transactions and access user funds. Although only two issuer processor systems 123 and two host banks 126 are shown, the payment service system network 100 may have any number of additional systems.

In particular embodiments, the host bank server 106b of host bank 2 126b may generate new bank accounts and may interact with the payment service system 124, issuer processor system 2 123b, and core processor system 125 to debit or credit the various bank accounts managed by the host bank 2 system 126b. In particular embodiments, the payment service system 124 may manage the user account balance shared between multiple host banks 126. As an example and not by way of limitation, if a user decides to use one payment card number at one merchant 121 and uses another payment card number at another merchant 121, the payment service system 124 may keep track of the balance in the account based on transactions performed with either payment card number.

In particular embodiments, the issuer processor system 2 123b may generate its own plurality of payment card numbers to be used in transactions. The issuer processor system 2 123b may maintain its own payment card numbers and handle any transactions associated with its payment card numbers.

In particular embodiments, the payment service system 124 may assign another payment card number to a user if an event occurs that disrupts the usage of a payment card number associated with the user's account. As an example and not by way of limitation, an outage may occur with one of the entities in the payment service system network 100 which may affect the use of a payment card number associated with an issuer processor system 1 123a and as a result assign a payment card number associated with an issuer processor system 2 123b. The payment service system 124 may also assign another payment card number in other scenarios.

Figure 2A:
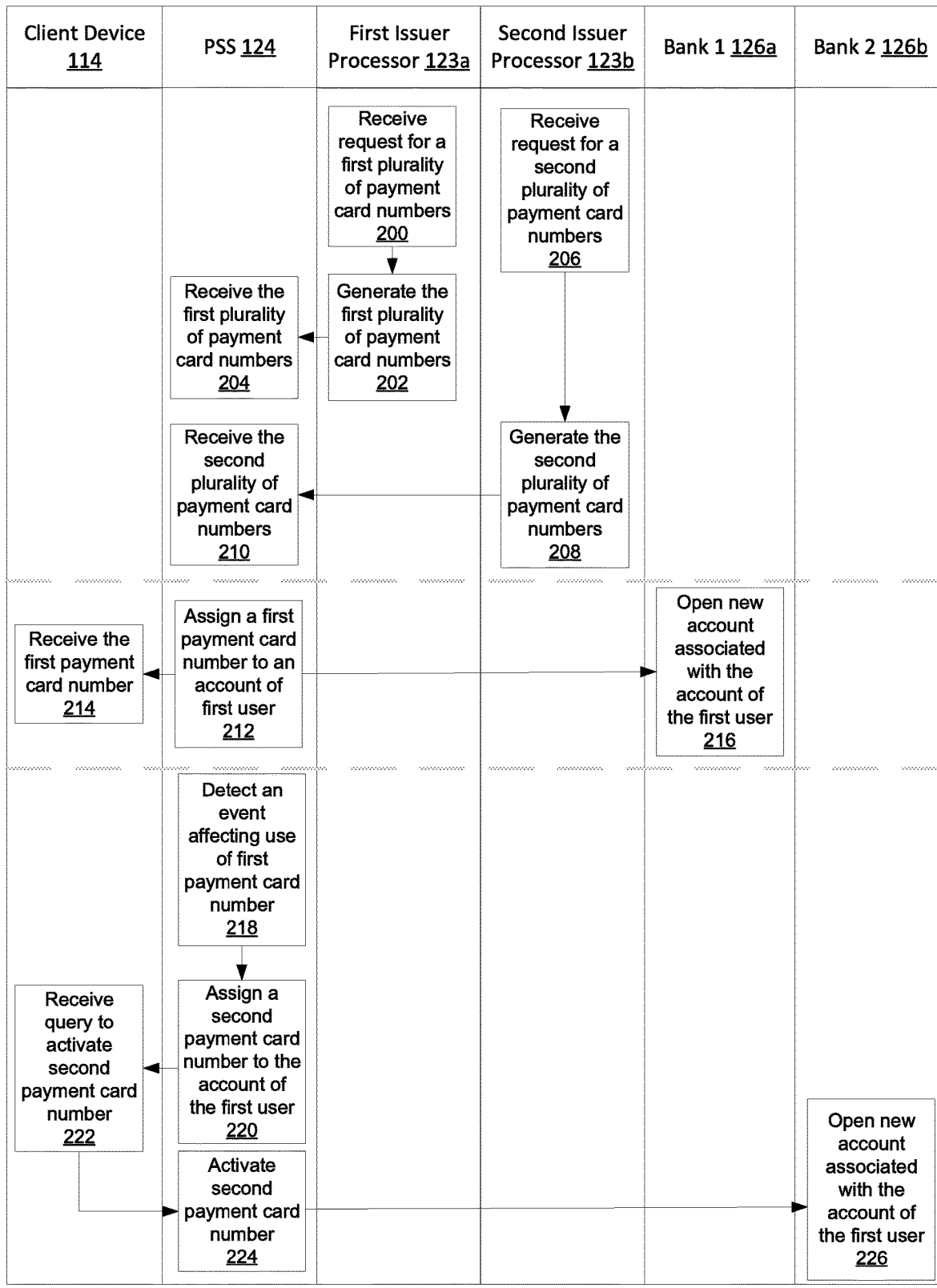
FIGS. 2A-2B illustrates an example process of assigning an account and payment card number and responding to a detected event.
Figure 2B:
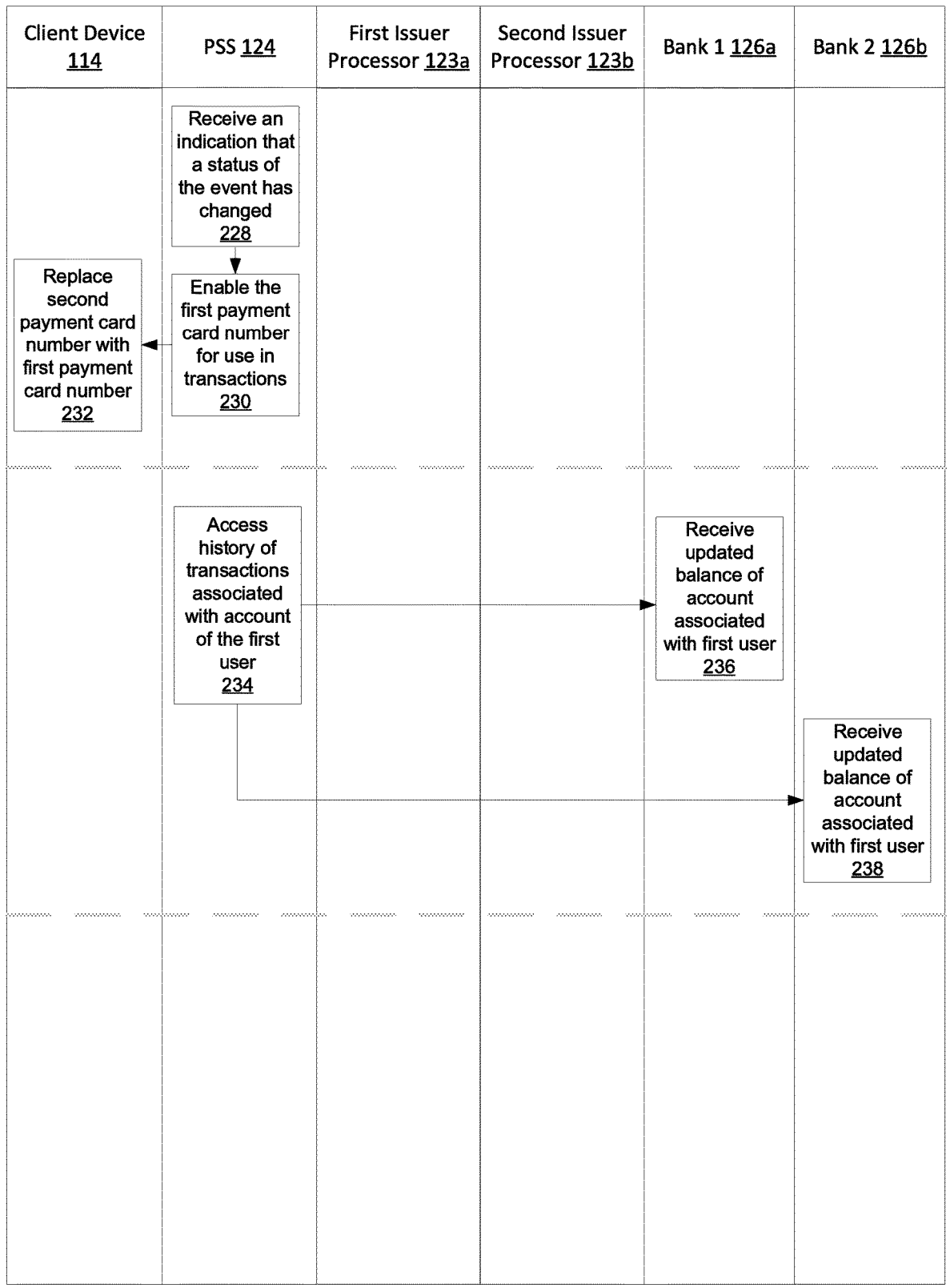

FIGS. 2A-2B illustrate a flowchart of a process for assigning an account and payment card number and responding to a detected event in a system including a client device 114, a payment service system 124, a first issuer processor 123a, a second issuer processor 123b, a first bank 126a, and a second bank 126b. The process may include four parts. First, steps 200-210 may illustrate a backend process for acquiring account information in anticipation of generating new accounts in the future. Second, steps 212-216 may illustrate a process of establishing a bank account. Third, steps 218-226 may illustrate a process for detecting an event and responding to the event by assigning another payment card number. The third part of the process may help ensure a user is able to perform transactions despite an event occurring. Fourth, steps 228-232 may illustrate a process of detecting a status change for the event and responding to the status change. The fourth part may help to remove friction in performing transactions by returning to normal operations with using the original payment card number for transactions. Fifth, steps 234-238 may illustrate a process for updating the account balance with the banks 126 to ensure the user account has been correctly debited.

In particular embodiments, in the first part of the process, the process may start with step 200 where a first issuer processor 123a may receive a request for a first plurality of payment card numbers. This step can include an automated request from the payment service system 124 to the first issuer processor 123a to receive a first batch of payment card numbers or a replenishment of numbers that the payment service system server 104 has already used. The automated request can be transmitted by the payment service system server 104 as an initial step to obtain an initial batch of payment card numbers. The automated request can also be transmitted after the number of payment card numbers falls below a predetermined threshold, e.g., 1,000 payment card numbers.

In particular embodiments, after step 200, the process may continue to step 202, where the first issuer processor 123a (or in the alternative the payment-service system 124) can generate a payment card number or a token representing the payment card number (or batch of numbers or tokens). The first issuer processor 123a may generate the payment card number by appending together several sets of digits, including a predetermined bank identification number (BIN) prefix, a set of randomly generated digits representing a number generated according to a random number generator algorithm, and one or more checksum digits generated and applied according to a checksum algorithm that confirms the uniqueness and accuracy of the new payment card number as a whole. Generally, the BIN prefix is a set of digits, typically six digits, associated with a bank or card issuer. The first issuer processor 123a or other entity may provide the BIN prefix to the payment-service-system server 104; the payment service system server 104 may store the BIN prefix digits and may be configured to apply the BIN prefix digits to new payment cards generated by the payment service system server 104, in accordance with the issuer processor 123 or other entity. The payment service system server 104 or the first issuer processor 123a may also generate a set of digits for the random number portion of the card number using a random number generator algorithm and generate a set of one or more digits based on a Luhn check algorithm (or other checksum algorithm) dictated by the first issuer processor 123a or other entity. The payment service system server 104 or the first issuer processor 123a may append the set of one or more Luhn check digits to the randomly generated set of digits. The payment service system server 104 or the first issuer processor 123a may then use the Luhn check digits to determine whether the randomly generated number is unique. The Luhn check digits and randomly generated digits may be appended to the BIN prefix together, at the same time, or individually, such that the Luhn check algorithm may determine the uniqueness of the randomly generated value with or without the BIN prefix value. In the example embodiment, the payment service system server 104 or the first issuer processor 123a may use the Luhn check digits and the Luhn check algorithm to confirm that the payment card number, comprising the digits of the randomly generated number appended to the BIN prefix digits, is a unique payment card number that does not match a second payment card number. In the event the payment service system server 104 or the first issuer processor 123a determines that the Luhn check fails, and thus there is a collision with a second payment card number (e.g., an existing or already-used payment card number), then the payment service system server 104 or the first issuer processor 123a may continue generating sets of digits for a random number until the payment service system server 104 or the first issuer processor 123a identifies a payment card number that satisfies the Luhn check algorithm, and does not match another payment card number. In some implementations, the payment service system server 104 or the first issuer processor 123a may calculate a token for the payment card number, where the payment card number may be generated and stored in a high-security module of the same or different payment service system server 104 or first issuer processor 123a, and the token may be exchanged with external entities and stored in databases and devices, such as the client device and the databases of third-party entities. The first issuer processor 123a may be configured to generate the token using an algorithm that uses a random number generator and one or more predetermined input values (e.g., user ID values, MAC address of client device). In particular embodiments, the tokenization algorithm may evolve or change over time, so as to require additional or alternative parameter inputs. The payment service system server 104 or the first issuer processor 123a may execute a random number generator to generate cryptographically secure random numbers according to the algorithm. When a computer generates cryptographically secure random numbers, it may be distinguishable from what may ordinarily be considered as identifying a number randomly. Patterns may emerge over time when computers are instructed to select a number at random, and thus special functions can be constructed to handle very large numeric values or alphanumeric strings for the random numbers to be truly random, to avoid collisions, and to prevent attackers from reverse engineering a pattern.

In particular embodiments, after step 202, the process may continue to step 204, where the payment service system server 104 may receive the first plurality of payment card numbers or tokens and store them in a payment service system database 107 for later retrieval. In this way, the payment service system 124 can be ready to establish accounts in real-time, without the need to contact additional severs to complete an account creation process. This can allow for users to have a simplified, seamless experience in generating a new account, which will make them more likely to use the account. This can increase usage of the payment service system 124 by making transaction easier for payors, merchants 121, and other payees. Following storage of the payment card numbers of tokens, the payment service system 124 can wait for a payment request. Additionally, in particular embodiments, the payment service system 124 may assign any of the first plurality of payment card numbers to an account.

In particular embodiments, while steps 206-210 are shown separate from steps 200-204, each set of steps may occur simultaneously, or steps 206-210 may occur prior to steps 200-204 or any order with respect to steps 200-204. Similarly to the first issuer processor 123a, at step 206, the second issuer processor 123b may receive a request for a second plurality of payment card numbers. In particular embodiments, after step 206, the process may continue to step 208, where the second issuer processor 123b (or in the alternative the payment service system) can generate a payment card number or a token representing the payment card number (or batch of numbers or tokens) similarly to the first issuer processor 123a. In particular embodiments, after step 208, the process may continue to step 210 where the payment service system 124 may receive the second plurality of payment card numbers.

In particular embodiments, in the second part of the process, the process may start with step 212, where the payment service system 124 may assign any number of first payment card numbers to user accounts. As an example and not by way of limitation, a user may be signing up for an account, and the payment service system 124 may assign an initial payment card number to the user account. Step 212 may occur after receiving a request to establish an initial account from a user. In particular embodiments, after step 212, the client device 114 may receive a first payment card number from the payment service system 124 in step 214. The first payment card number may be associated with the user account of the user of the client device 114 and be used for transactions to access user funds. Additionally, in particular embodiments, the first bank may open a new account associated with the account of the first user in step 216.

In particular embodiments, in the third part of the process, the process may start with step 218, where the payment service system 124 may detect an event affecting use of the first payment card number. As an example and not by way of limitation, the event may be an outage experienced by the first issuer processor 123*a* that prevents the user of the first payment card number in a transaction. In some instances, the client device 114 may initially request to perform a transaction and the payment service system 124 may detect the event in response to the request. As an example and not by way of limitation, the payment service system 124 may detect the event by receiving an indication that the first issuer processor 123*a* is unable to process the transaction. In particular embodiments, detecting the event may comprise determining that a number of users attempting to user their respective first payment card number within a specific duration of time exceeds a maximum threshold. As an example and not by way of limitation, the payment service system 124 may limit the number of users trying to perform a transaction with their first payment card within a few second timeframe. By limiting the number of users attempting to perform a transaction, the payment service system 124 may proactively reduce a likelihood of an outage. The payment service system 124 may detect that 1000 users are attempting to perform a transaction within a second interval. As a result, the payment service system 124 may detect that this number of users may exceed a maximum threshold within a specific duration of time. In particular embodiments, the payment service system 124 may detect the user of the client device 114 has changed geographic locations that may affect the use of the payment card number. As an example and not by way of limitation, the user may travel to a foreign country. In particular embodiments, the payment service system 124 may assign a temporary payment card number for the user to use for transactions for the duration of the trip in the foreign country.

In particular embodiments, the user may send a request through client device 114 for a temporary payment card number. As an example and not by way of limitation, a user may have need for a temporary payment card number, such as for a trial period or subscription service. For instance, if a merchant 121 is running a promotional period for a service, the user may request a temporary payment card number to be used for the promotional period, so the user does not forget to cancel the service if the user only wants to use the service during the promotional period. The user may set various parameters for the temporary payment card number. As an example and not by way of limitation, the user may set a time period, a geographic location, an amount of funds, and other parameters of a payment card number. The user may set that a temporary payment card number to expire after a time period has elapsed, for instance, for a promotional period. The user may add a geographic location restriction associated with a temporary payment card number so the payment card number will be removed when the user is outside the geographic location. The user may allocate an amount from their account balance to a temporary payment card number to prevent overspending or the like. As an example and not by way of limitation, the payment service system 124 may allocate a portion, to be used for transactions, of an account balance associated with the account to the temporary payment card number. The allocation may aid the user in paying exactly for services during a promotional period (or regular priced services) or help with budgeting to prevent the user from spending more than an allocated amount. The parameters of the payment card number may help remove the payment card number from the user's access when determined appropriate. As an example and not by way of limitation, if a condition or parameter is satisfied for some parameters and not satisfied for other parameters, then the payment service system 124 may remove the temporary payment card number from the user's access. For instance, if the user has spent more than an allocated amount of the user's account balance through transactions using the temporary payment card number, then the payment service system 124 may remove the temporary payment card number from the user's access. For instance, removing the temporary payment card number from the user's digital wallet. In particular embodiments, there may be categories associated with transactions. The user may request a temporary payment card number to be used for transactions for a particular category. As an example and not by way of limitation, the user may request a temporary payment card number for groceries. The payment service system 124 may allocate a portion of the account balance for groceries. After the allocated portion is used in transactions, then the payment service system 124 may disable the temporary payment card number for use in transactions.

In particular embodiments, when the payment service system 124 detects an event affecting use of a first payment card number, the payment service system 124 may send a notification to one or more users that an event has been detected that affects the use of the first payment card number for transactions. In particular embodiments, the notification may be sent in response to an attempted transaction. As an example and not by way of limitation, a notification may only be sent when a user attempts to perform a transaction when an event occurs. In particular embodiments, the notification may comprise an indication that the first payment card number has been disabled for transactions.

In particular embodiments, after step 218, the process may continue to step 220, where the payment service system 124 may assign a second payment card number to the account of the first user. The payment service system 124 may access the second plurality of payment card numbers issued from the second issuer processor 123*b* and assign one of the second payment card numbers to the account of the first user. In particular embodiments, the payment service system 124 may determine a number of users to assign a second payment card number. The payment service system 124 may determine the number of users based on the number of users actively trying to perform transactions as well as parameters associated with the first issuer processor 123*a*, the second issuer processor 123*b*, the first bank 126*a*, and the second bank 126*b*. As an example and not by way of limitation, if the payment service system 124 is attempting to prevent an outage, the payment service system 124 may preemptively assign second payment card numbers to a plurality of users to reduce the number of transactions being performed through a first issuer processor 123*a*. There may be various costs associated with each of the first issuer processor 123*a*, second issuer processor 123*b*, first bank 126*a*, and second bank 126*b*. The payment service system 124 may determine a number of users to assign second payment card numbers based on the costs associated with the first issuer processor 123*a*, second issuer processor 123*b*, first bank 126*a*, and second bank 126*b*.

In particular embodiments, after step 220, the process may continue to step 222, where the client device 114 may receive a query to activate the second payment card number. In particular embodiments, the payment service system 124 may send a notification to client device 114 to request user approval to activate the second payment card number. The request may provide terms and conditions for using the second payment card number similarly to the activation process of the first payment card number. In order to access user funds, the user can accept the request to activate the second payment card number. In particular embodiments, after step 222, the process may continue to step 224, where the payment service system 124 may activate the second payment card number for the user to use in transactions in response to a user sending a confirmation of approval through client device 114. In particular embodiments, after step 224, the process may continue to step 226, where the second bank 126b may open a new account associated with the account of the first user. In particular embodiments, when the second payment card number is activated, the second payment card number is enabled to be used for transactions and the first payment card number may be disabled for use in transactions. In particular embodiments, the notification to request approval to enable the second payment card number may be sent in conjunction with the notification that indicates the first payment card number has been disabled.

In particular embodiments, in the fourth part of the process, the process may start with step 228, where the payment service system 124 may receive an indication that a status of the event has changed. As an example and not by way of limitation, if the event was an outage, the status may be an indication that the outage has been resolved and the first payment card numbers may be used again. As another example and not by way of limitation, if the event was a threshold number of users performing transactions or attempting to perform transactions within a specific duration of time, then the change in status may be the number of users attempting to user their payment card numbers fall below the threshold number. In particular embodiments, where the user has set parameters for a second payment card number (e.g., a temporary payment card number), the change in status may be associated with one or more set parameters. As an example and not by way of limitation, the change in status may be an allocated amount of an account balance may be used completely. As another example and not by way of limitation, the change in status may be a user has moved outside a geographic location. As another example and not by way of limitation, a change in status may be a time period has elapsed.

In particular embodiments, after step 228, the process may continue with step 230, where in response to the payment service system 124 receiving an indication of a status change that restores use to a first payment card number and other status changes, the payment service system 124 may enable the first payment card number for use in transactions. The payment service system 124 may also disable the second payment card number in response to enabling the first payment card number for use in transactions. In some instances, both the first payment card number and the second payment card number may be enabled at the same time. As an example and not by way of limitation, the first payment card number may be used for any transactions and the second payment card number may be used for transactions at a particular location.

In particular embodiments, after step 230, the process may continue to step 232 where the payment service system 124 may send a notification that comprises an indication that the first payment card number has been enabled and the second payment card number has been disabled for transactions. The client device 114 may receive instructions to replace the second payment card number with the first payment card number in a digital wallet. In particular embodiments, the payment service system 124 may hide the second payment card number from view so the user cannot inadvertently use the second payment card number for transactions. In the instance another event affecting the use of the first payment card number is detected, the payment of 41 service system 124 may reenable the second payment card number and disable the first payment card number.

In particular embodiments, in the fifth part of the process, the process may start with step 234, where the payment service system 124 may access a history of transactions associated with the account of the first user. The payment service system 124 may access a log of transactions. Any transactions performed with the second payment card number while the second payment card number is enabled, the payment service system 124 may facilitate processing the transaction using the account and the second payment card number. The payment service system 124 may update an account balance associated with the account based on the transaction amount. In particular embodiments, after step 234, the payment service system 124 may send transaction data to each of the banks 126 in steps 236 and 238. In particular embodiments, in step 236, the first bank 126a may receive an updated balance of an account associated with the first user and update the balance in the bank 126a accordingly. As such, the first bank 126a may send funds to a different bank 126 or merchant 121 if necessary. In particular embodiments, similarly to step 236, in step 238, the second bank 126b may receive an updated balance of an account associated with the first user and update the balance in the bank 126b accordingly.

Figure 3:
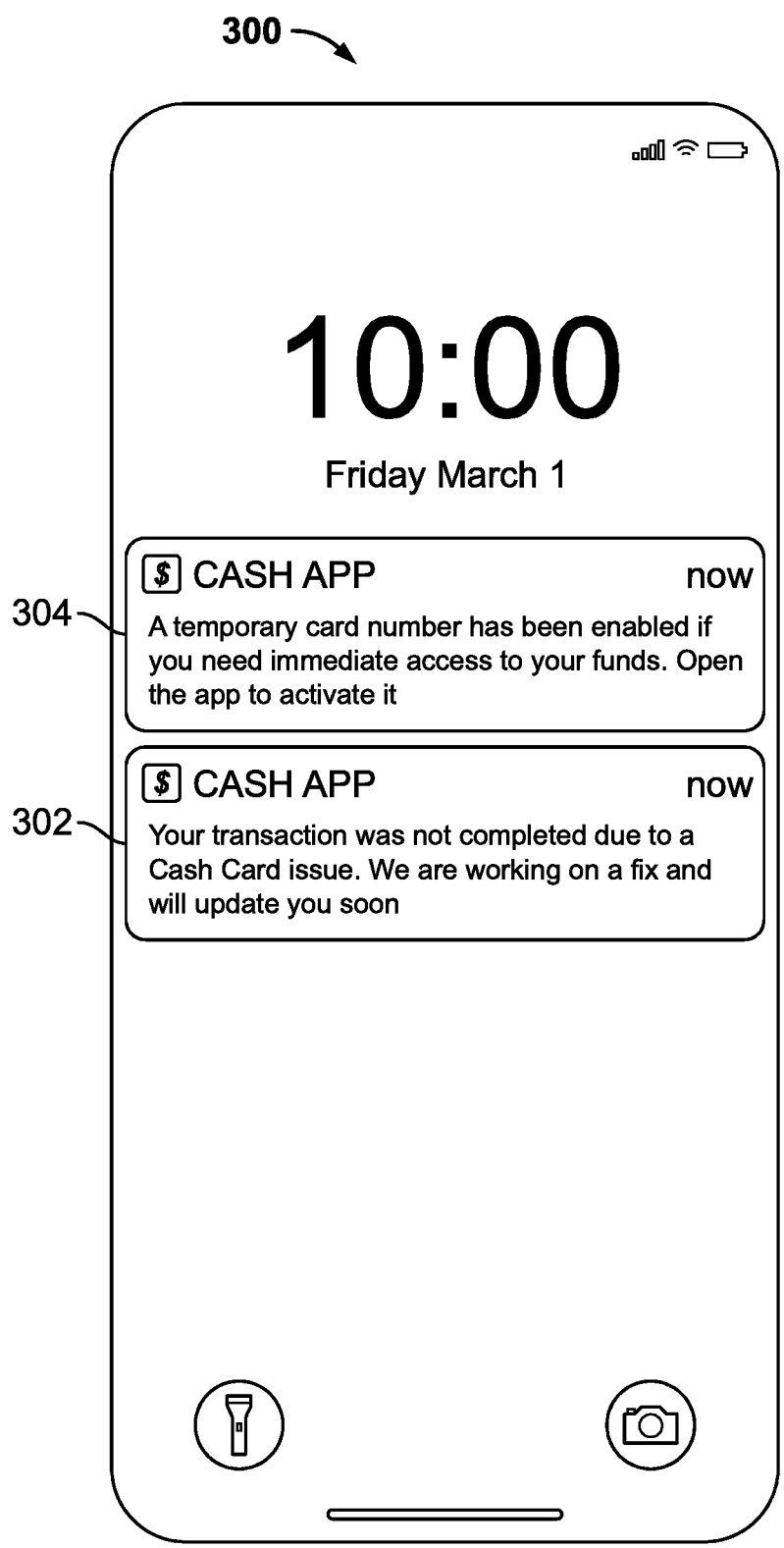
FIG. 3 illustrates an example graphical user interface for receiving a notification of an interrupted transaction.

FIG. 3 illustrates an example graphical user interface 300 for receiving a notification of an interrupted transaction. In particular embodiments, a graphical user interface 300 may comprise two notifications 302, 304. The graphical user interface 300 may be a part of client device 114. A user may be attempting to perform a transaction with his or her payment card number associated with their user account. In facilitating the transaction, a payment service system 124 may detect an event that affects the use of the payment card number in a transaction. As an example and not by way of limitation, the payment service system 124 may have received an indication that a first issuer processor 123a cannot process the transaction. In response to the detected event, the payment service system 124 may send the notification 302 to client device 114 that comprises an indication that an event has been detected that affects the use of the payment card number in transactions. The notification 302 may indicate that the payment card number is disabled. In particular embodiments, the payment service system may send the notification 304 to client device 114 that comprises an indication that a temporary payment card number has been enabled and a request for approval to activate the temporary payment card number. In particular embodiments, either of the notifications 302, 304 may comprise activatable links to open a user interface to interact with a user account of a payment service system of the user. After a user clicks on the link of either notification 302, 304, the graphical user interface 300 may switch to the graphical user interface 400 of FIG. 4.

Figure 4:
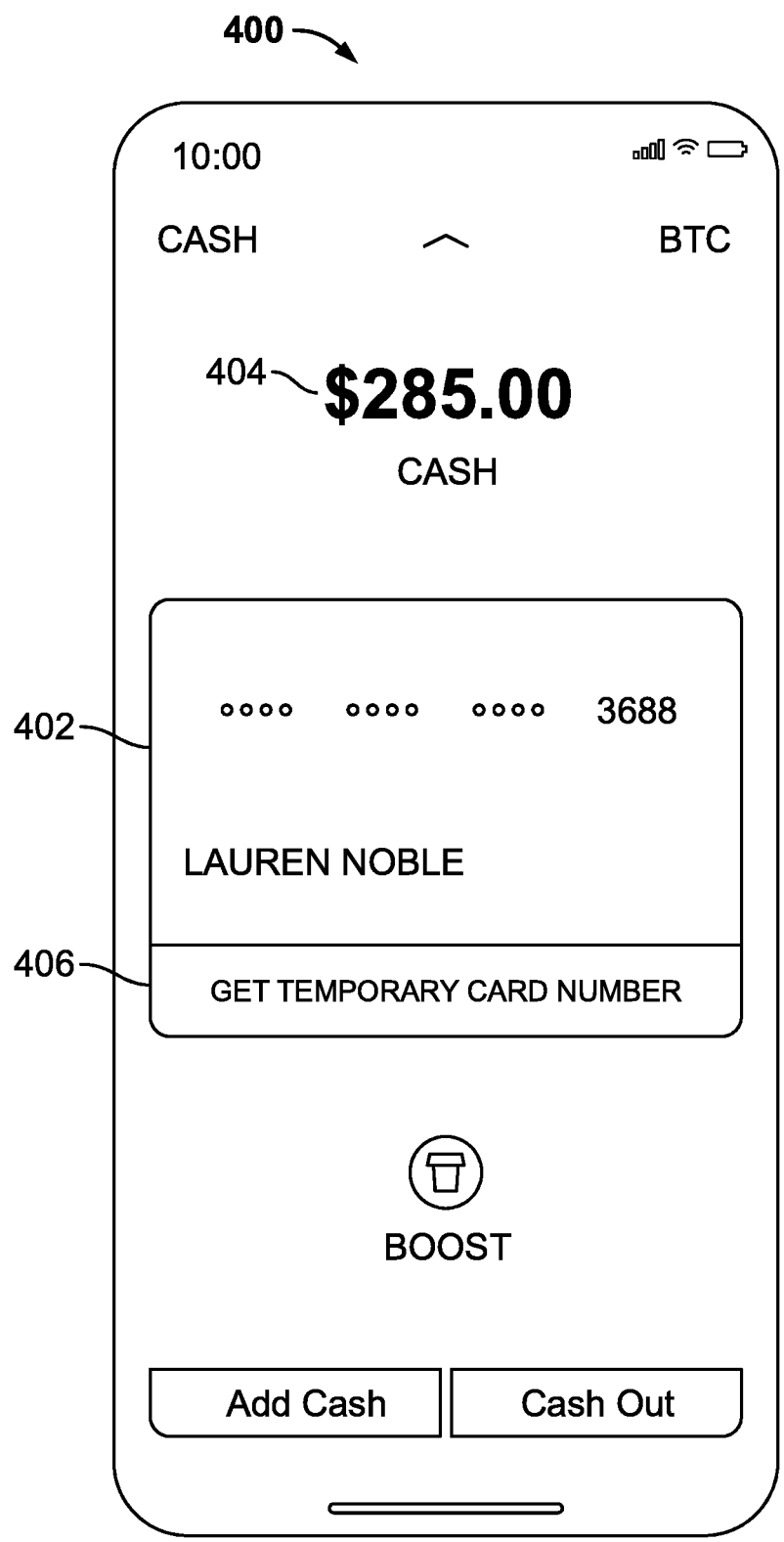
FIG. 4 illustrates an example graphical user interface containing a payment card number of a user account and a link to activate a temporary virtual payment card number.

FIG. 4 illustrates an example graphical user interface 400 containing a payment card number 402 of a user account, an account balance 404, and a link 406 to activate a temporary card number. In particular embodiments, the graphical user interface 400 may comprise other interactive elements, such as an "add cash" button, "cash out" button, and the like. The graphical user interface 400 may be a part of client device 114. In particular embodiments, the payment card number 402 may be visually altered from a default view to indicate that the payment card number 402 is not enabled for transactions. As an example and not by way of limitation, the payment card number 402 may be hidden from view in the instance that it is disabled from being used for transactions. In particular embodiments, the link 406 may activate the temporary payment card number for use in transactions.

Figure 5:
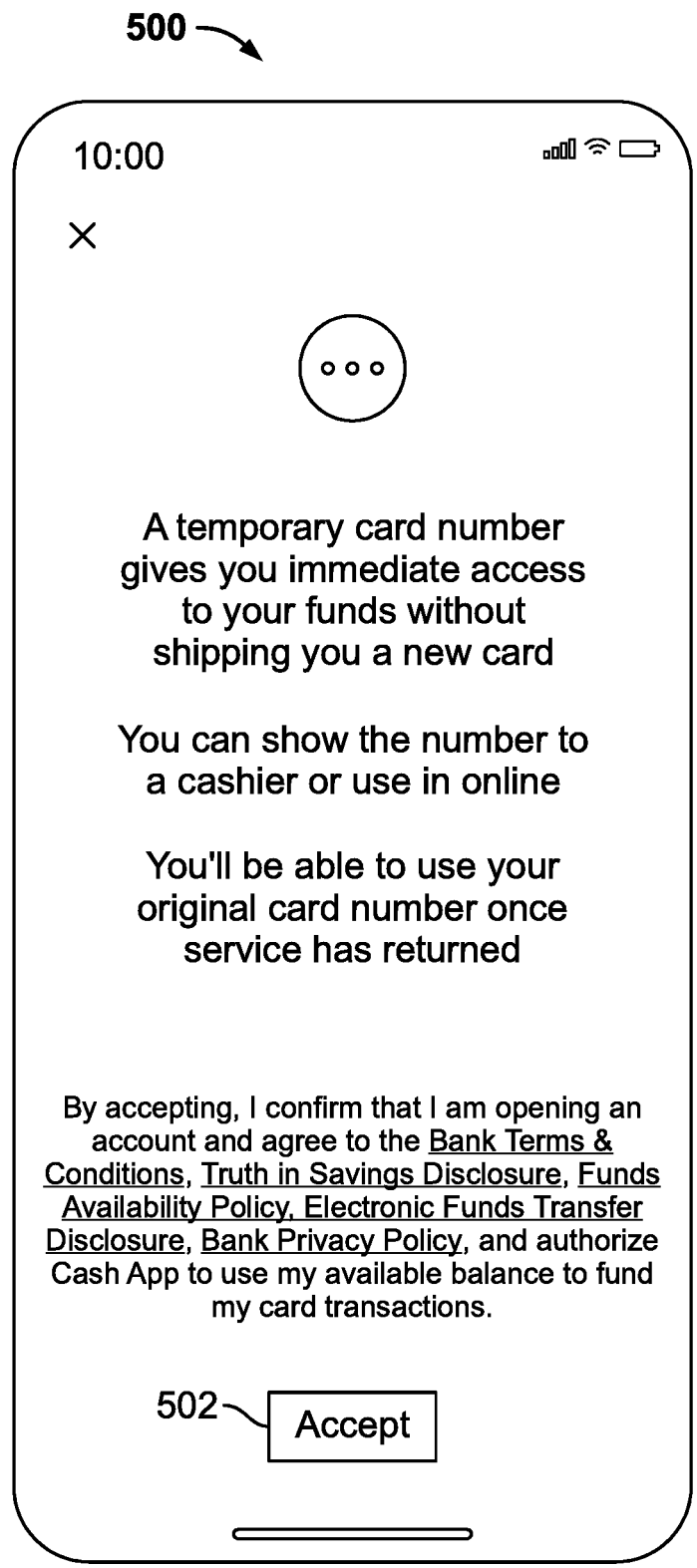
FIG. 5 illustrates an example graphical user interface containing a request to approve the temporary virtual payment card number.

FIG. 5 illustrates an example graphical user interface 500 containing a request to approve the temporary payment card number. The graphical user interface 500 may be a part of client device 114. In particular embodiments, the graphical user interface 500 may comprise a disclosure in activating the temporary payment card number. In particular embodiments, the graphical user interface 500 may comprise an accept button 502 to accept the terms associated with the new temporary payment card number. After the user presses the accept button 502, the payment service system 124 may activate the temporary payment card number for use in transactions. After the user accepts the temporary payment card number, the user may be presented the graphical user interface 600 shown in FIG. 6

Figure 6:
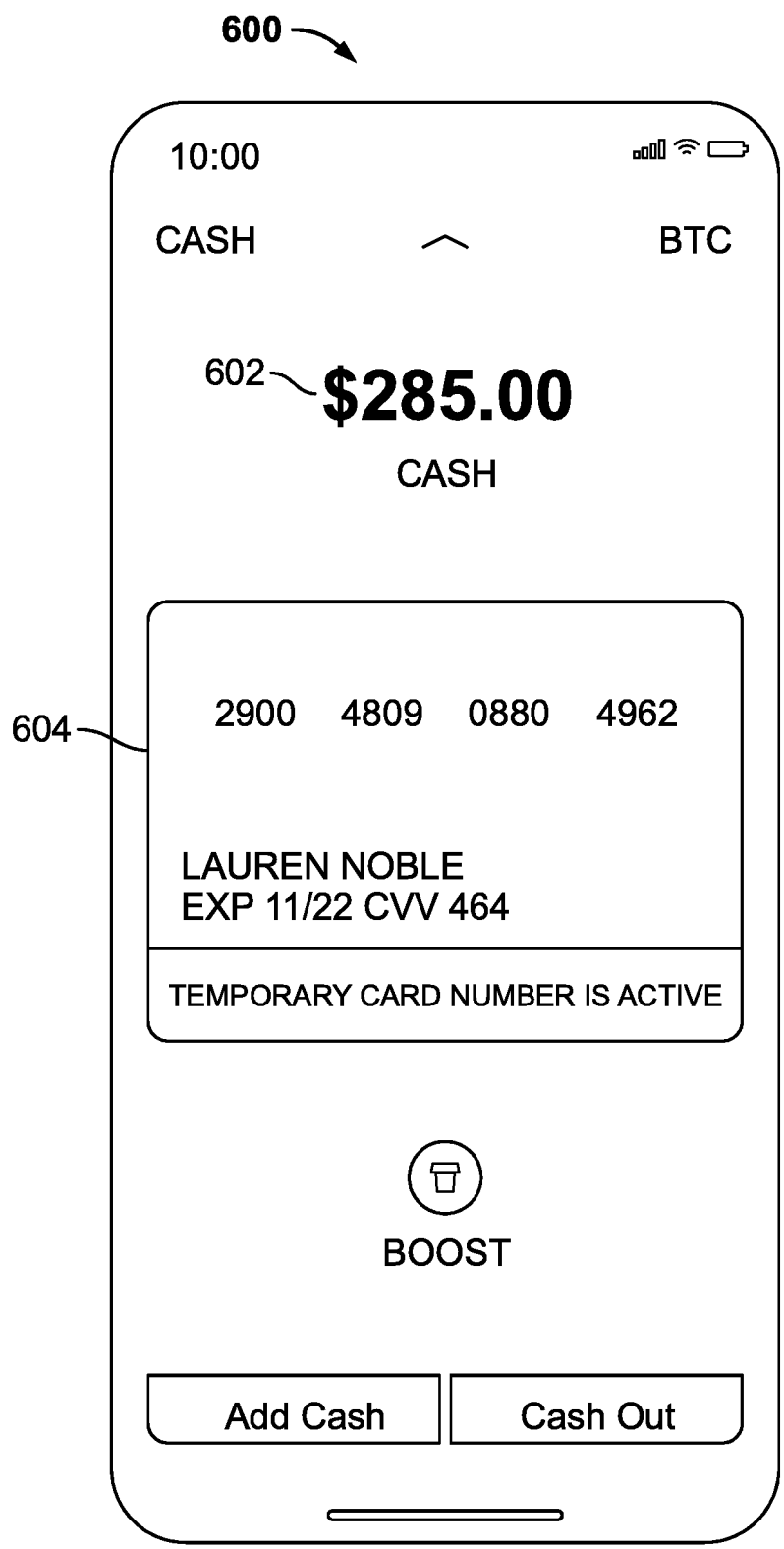
FIG. 6 illustrates an example graphical user interface containing the temporary virtual payment card number listed as active.

FIG. 6 illustrates an example graphical user interface 600 containing an account balance 602 and a temporary payment card number 604. The graphical user interface 600 may be a part of client device 114. The temporary payment card number 604 may present all the details of the temporary payment card number 604 for the user to use in transaction. For instance, if the user has to input the number on an online transaction or at a merchant 121, the user has the details to perform a transaction. In particular embodiments, the payment card number 402 is hidden from view as it is disabled and replaced with an enabled temporary payment card number 604.

Figure 7:
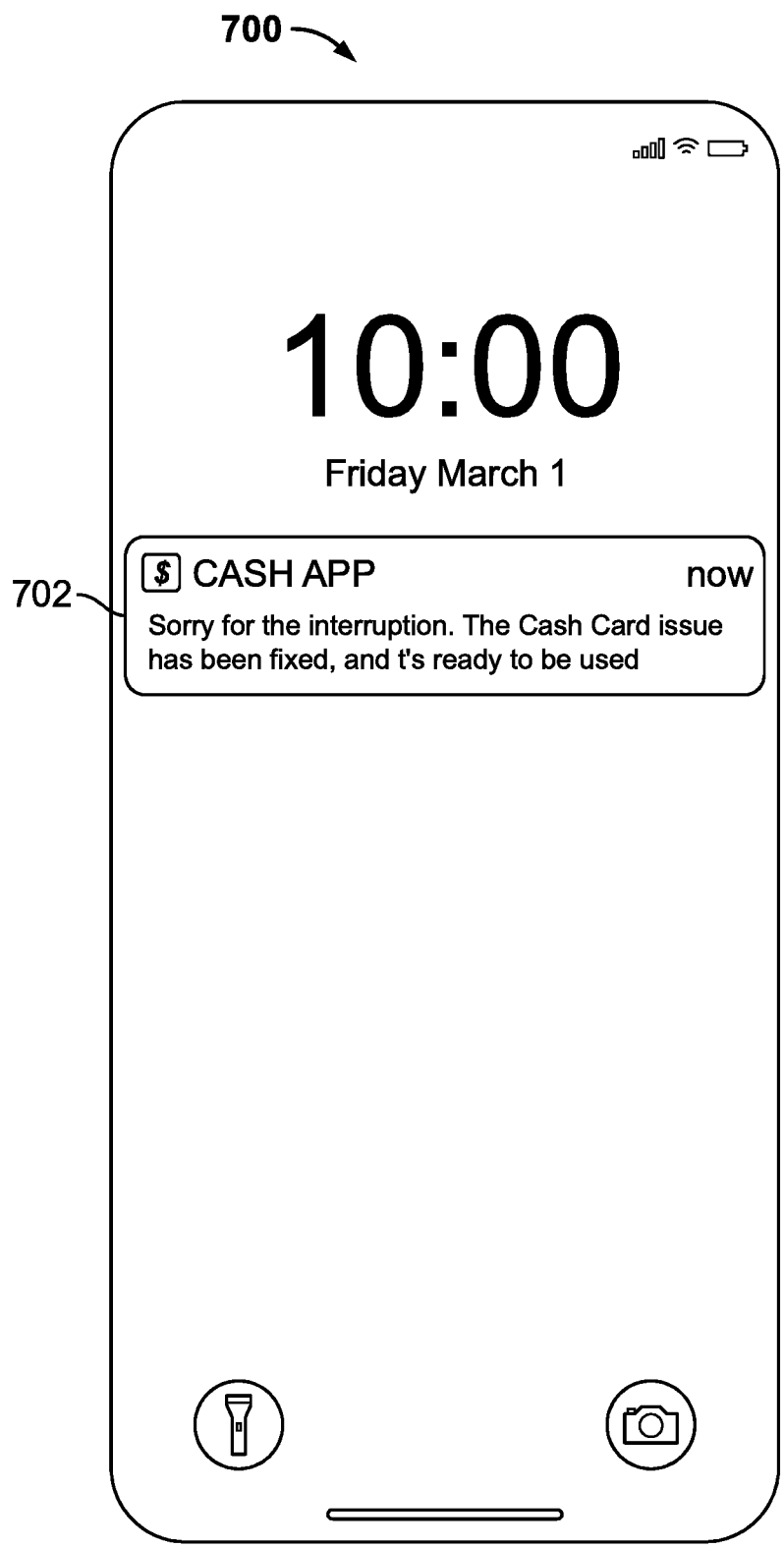
FIG. 7 illustrates an example graphical user interface containing a notification of a restored access to the payment card number of the user account.

FIG. 7 illustrates an example graphical user interface 700 containing a notification 702. The graphical user interface 700 may be a part of client device 114. In particular embodiments, the payment service system 124 may receive an indication of a change in status of an event that affected the use of the payment card number 402. As an example and not by way of limitation, an outage associated with a first issuer processor 123a may be resolved. The payment service system 124 may send to the notification 702 to a client device 114 that comprises an indication that the status of the event has changed and the payment card number 402 has been enabled for use in transactions. In particular embodiments, the enabling of the payment card number 402 may disable the temporary payment card number 604 to be used for transactions.

Figure 8:
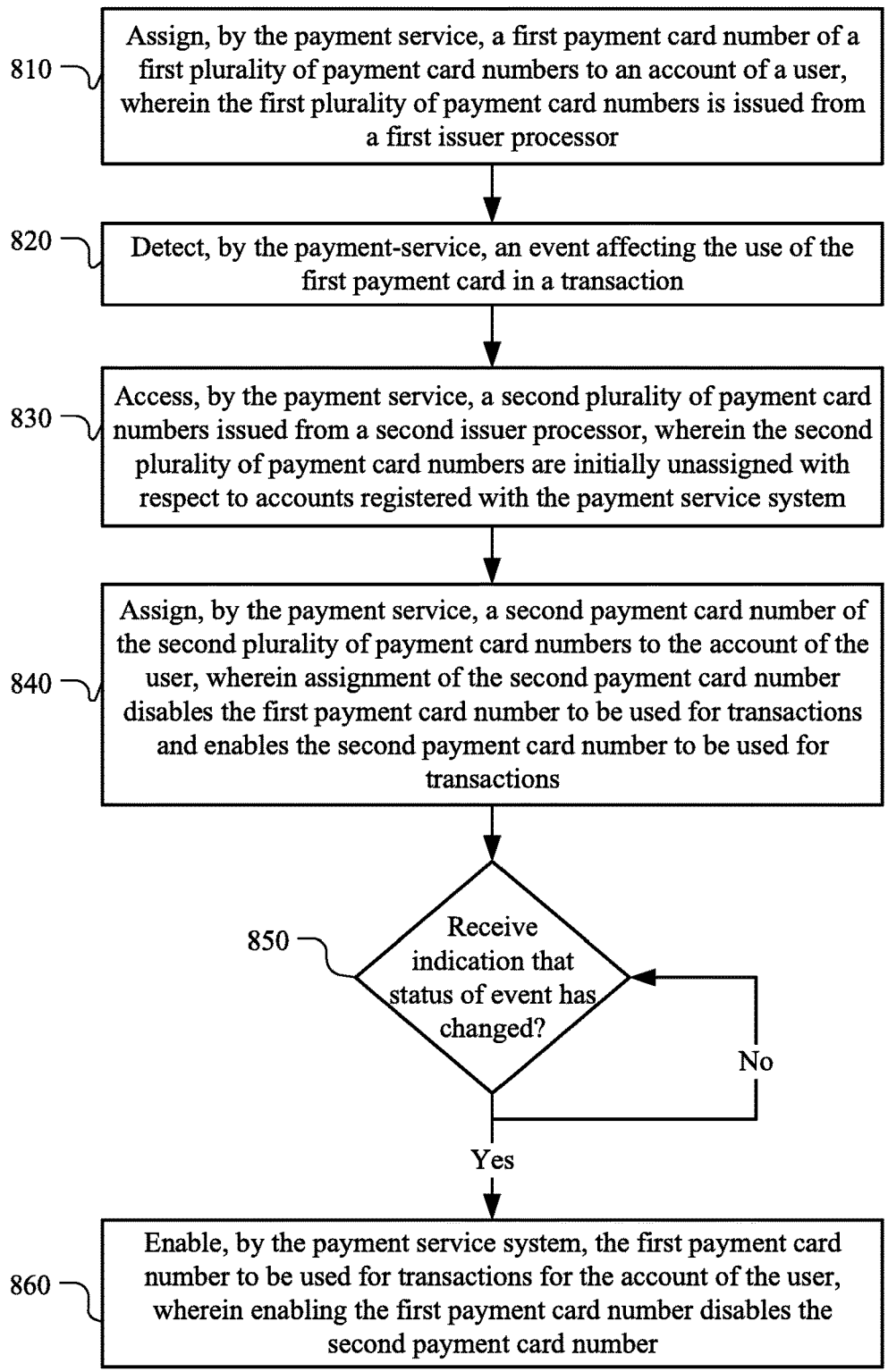
FIG. 8 illustrates an example method for assigning a temporary virtual payment card number to a user account.

FIG. 8 illustrates an example method 800 for assigning a temporary virtual payment card number to a user account. The method 800 may being at step 810, where the payment service system may assign a first payment card number of a first plurality of payment card numbers to an account of a user. In particular embodiments, the first plurality of payment card numbers may be issued from a first issuer processor. At step 820, the payment service system may detect an event affecting the use of the first payment card in a transaction. At step 830, the payment service system may access a second plurality of payment card numbers issued from a second issuer processor. In particular embodiments, the second plurality of payment card numbers may be initially unassigned with respect to accounts registered with the payment service system. At step 840, the payment service system may assign a second payment card number of the second plurality of payment card numbers to the account of the user. In particular embodiments, the assignment of the second payment card number may disable the first payment card number to be used for transactions and enables the second payment card number to be used for transactions. At step 850, the payment service system may determine whether an indication that a status of the event has changed has been received. If no indication has been received the payment service system may continue to check to see if an indication has been received. However, if an indication has been received, the method 800 may proceed to step 860, where the payment service system may enable the first payment card number to be used for transactions for the account of the user. In particular embodiments, the enabling the first payment card number may disable the second payment card number. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for assigning a temporary virtual payment card number to a user account including the particular steps of the method of FIG. 8, this disclosure contemplates any suitable method for assigning a temporary virtual payment card number to a user account including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
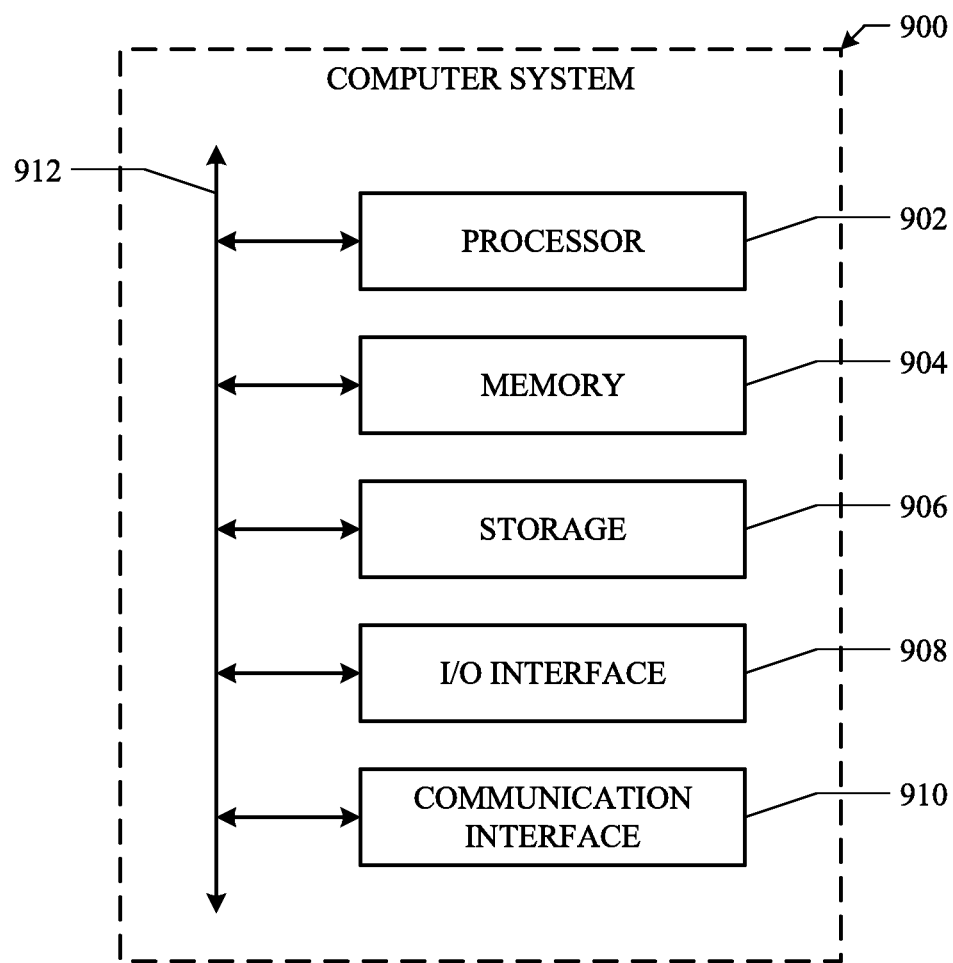
FIG. 9 illustrates an example computer system.

FIG. 9 illustrates an example computer system 900. The computer system 900 may be a computer system associated with the payment service system 124 or client device 114. While these devices may have components in common, such as those illustrated in FIG. 9, it should be appreciated that each of the payment service system 124 or client device 114 may be specialized devices configured for their specific purposes. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As an example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data of 41 caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices associated with a payment service:

assigning, by the payment service, a first payment card number of a first plurality of payment card numbers to an account of a user, wherein the first plurality of payment card numbers is issued from a first issuer processor, and wherein assigning the first payment card number comprises mapping the first payment card number to the account of the user in a database of the payment service;

receiving, by the payment service and from a merchant computing device, a request to process a transaction involving the first payment card number;

detecting, by the payment service, that the first issuer processor is unable to process the transaction involving the first payment card number;

in response to detecting that the first issuer processor is unable to process the transaction, automatically and temporarily disabling, by the payment service and in the database of the payment service, the first payment card number to prevent use of the first payment card number for at least the transaction;

in response to detecting that the first issuer processor is unable to process the transaction, automatically accessing, by the payment service, a second plurality of payment card numbers issued from a second issuer processor, wherein the second plurality of payment card numbers are unassigned with respect to accounts registered with the payment service;

in response to detecting that the first issuer processor is unable to process the transaction, automatically assigning, by the payment service, a second payment card number of the second plurality of payment card numbers to the account of the user, wherein assigning the second payment card number comprises mapping the second payment card number to the account of the user in the database of the payment service and enables use of the second payment card number for the transaction instead of the first payment card number;

processing, by the payment service, the transaction involving the first payment card number using the second payment card number instead of the first payment card number;

receiving, by the payment service, an indication that the first issuer processor is able to process one or more transactions;

in response to receiving the indication, automatically re-enabling, by the payment service and in the database of the payment service, the first payment card number for use in the one or more transactions; and in response to receiving the indication, automatically disabling, by the payment service and in the database of the payment service, the second payment card number to prevent use of the second payment card number in the one or more transactions.

2. The method of claim 1, wherein the first issuer processor is unable to process the transaction due to an outage experienced by the first issuer processor.

3. The method of claim 2, wherein detecting that the first issuer processor is unable to process the transaction comprises receiving an indication from the first issuer processor that the first issuer processor is unable to process the transaction.

4. The method of claim 1, wherein detecting that the first issuer processor is unable to process the transaction comprises determining that a number of users attempting to use their respective first payment card number within a specific duration of time exceeds a maximum threshold.

5. The method of claim 4, wherein the indication that the first issuer processor is able to process one or more transactions is based at least in part on a determination that the number of users attempting to use their respective first payment card number no longer exceeds the maximum threshold.

6. The method of claim 1, further comprising:
prior to enabling use of the second payment card number, sending a notification to a user computing device of the user that comprises an indication that the first payment card number has been temporarily disabled for at least the transaction and a request for approval to enable use of the second payment card number.

7. The method of claim 6, further comprising:
receiving, from the user computing device, a confirmation of approval to enable use of the second payment card number; and
enabling use of the second payment card number subsequent to receiving the confirmation of approval.

8. The method of claim 1, further comprising, after detecting that the first issuer processor is unable to process the transaction:
sending a notification to a user computing device of the user that comprises an indication that the first payment card number has been temporarily disabled for at least the transaction and an indication that use of the second payment card number has been enabled.

9. The method of claim 1, further comprising, after receiving the indication that the first issuer processor is able to process one or more transactions:
sending a notification to a user computing device of the user that comprises an indication that the first payment card number has been re-enabled and an indication that the second payment card number has been disabled.

10. The method of claim 1, further comprising:
receiving, from a user computing device of the user, a payment request to debit the account, wherein the payment request comprises an amount and the second payment card number;
determining that use of the second payment card number is enabled; and
facilitating processing of the payment request using the account and the second payment card number.

11. The method of claim 10, further comprising:
updating, by the payment service, an account balance associated with the account based on the amount.

12. The method of claim 1, wherein a predetermined time period is associated with enablement of use of the second payment card number, the method further comprising:
disabling use of the second payment card number after the predetermined time period has elapsed.

13. The method of claim 1, wherein the second payment card number is associated with a virtual payment card, wherein assigning the second payment card number further comprises sending a cryptogram token corresponding to the second payment card number to a user computing device of the user, and wherein use of the second payment card number for the transaction instead of the first payment card number comprises the user computing device of the user sending the cryptogram token corresponding to the second payment card number to the merchant computing device.

14. The method of claim 1, wherein processing the transaction involving the first payment card number using the second payment card number instead of the first payment card number comprises:
receiving, by the payment service and from the merchant computing device, a second request to process a transaction involving the first payment card number;
automatically identifying, in the database of the payment service, the second payment number assigned to the account of the user and mapped to the account of the user in the database; and
processing the second transaction involving the first payment card number using the second payment card number instead of the first payment card number.

15. One or more computer-readable non-transitory storage media communicatively coupled with one or more processors of a computing device associated with a payment service embodying software that is operable, when executed by the one or more processors, to cause the one or more processors to perform operations comprising:
assigning, by the payment service, a first payment card number of a first plurality of payment card numbers to an account of a user, wherein the first plurality of payment card numbers is issued from a first issuer processor, and wherein assigning the first payment card number comprises mapping the first payment card number to the account of the user in a database of the payment service;

receiving, by the payment service and from a merchant computing device, a request to process a transaction involving the first payment card number;

detecting, by the payment service, that the first issuer processor is unable to process the transaction involving the first payment card number;

in response to detecting that the first issuer processor is unable to process the transaction, automatically and temporarily disabling, by the payment service and in the database of the payment service, the first payment card number to prevent use of the first payment card number for at least the transaction;

in response to detecting that the first issuer processor is unable to process the transaction, automatically accessing, by the payment service, a second plurality of payment card numbers issued from a second issuer processor, wherein the second plurality of payment card numbers are unassigned with respect to accounts registered with the payment service;

in response to detecting that the first issuer processor is unable to process the transaction, automatically assigning, by the payment service, a second payment card number of the second plurality of payment card numbers to the account of the user, wherein assigning the second payment card number comprises mapping the second payment card number to the account of the user in the database of the payment service and enables use of the second payment card number for the transaction instead of the first payment card number;

processing, by the payment service, the transaction involving the first payment card number using the second payment card number instead of the first payment card number;

receiving, by the payment service, an indication that the first issuer processor is able to process one or more transactions; and in response to receiving the indication, automatically re-enabling, by the payment service an in the database of the payment service, the first payment card number for use in the one or more transactions; and in response to receiving the indication, automatically disabling, by the payment service and in the database of the payment service, the second payment card number to prevent use of the second payment card number in the one or more transactions.

16. The one or more computer-readable non-transitory storage media of claim 15, wherein the first issuer processor is unable to process the transaction due to an outage experienced by the first issuer processor, and wherein detecting that the first issuer processor is unable to process the transaction comprises receiving an indication from the first issuer processor that the first issuer processor is unable to process the transaction.

17. The one or more computer-readable non-transitory storage media of claim 15, wherein the software is further operable when executed to cause the one or more processors to perform further operations comprising:

prior to enabling use of the second payment card number, sending a notification to a user computing device of the user that comprises an indication that the first payment card number has been temporarily disabled for at least the transaction and a request for approval to enable use of the second payment card number;

receiving, from the user computing device, a confirmation of approval to enable use of the second payment card number; and enabling use of the second payment card number subsequent to receiving the confirmation of approval.

18. The one or more computer-readable non-transitory storage media of claim 15, wherein the software is further operable when executed to cause the one or more processors to perform further operations comprising:

receiving, from a user computing device of the user, a payment request to debit the account, wherein the payment request comprises an amount and the second payment card number;

determining that use of the second payment card number is enabled;

facilitating processing of the payment request using the account and the second payment card number; and updating, by the payment service, an account balance associated with the account based on the amount.

19. A system associated with a payment service comprising: one or more processors; and a non-transitory memory in communication with the processors comprising instructions executable by the processors, the processors operable when executing the instructions to perform operations comprising:

assigning, by the payment service, a first payment card number of a first plurality of payment card numbers to an account of a user, wherein the first plurality of payment card numbers is issued from a first issuer processor, and wherein assigning the first payment card number comprises mapping the first payment card number to the account of the user in a database of the payment service;

receiving, by the payment service and from a merchant computing device, a request to process a transaction involving the first payment card number;

detecting, by the payment service, that the first issuer processor is unavailable to process the transaction involving the first payment card number;

in response to detecting that the first issuer processor is unavailable to process the transaction automatically and temporarily disabling, by the payment service and in the database of the payment service, the first payment card number to prevent use of the first payment card number for at least the transaction;

in response to detecting that the first issuer processor is unable to process the transaction, automatically accessing, by the payment service, a second plurality of payment card numbers issued from a second issuer processor, wherein the second plurality of payment card numbers are unassigned with respect to accounts registered with the payment service;

in response to detecting that the first issuer processor is unable to process the transaction, automatically assigning, by the payment service, a second payment card number of the second plurality of payment card numbers to the account of the user, wherein assigning the second payment card number comprises mapping the second payment card number to the account of the user in the database of the payment service and enables use of the second payment card number for the transaction instead of the first payment card number;

processing, by the payment service, the transaction involving the first payment card number using the second payment card number instead of the first payment card number;

receiving, by the payment service, an indication that the first issuer processor is able to process one or more transactions;

in response to receiving the indication, automatically re-enabling, by the payment service and in the database of the payment service, the first payment card number for use in the one or more transactions; and in response to receiving the indication, automatically disabling, by the payment service and in the database of the payment service, the second payment card number to prevent use of the second payment card number in the one or more transactions.

20. The system of claim 19, wherein first issuer processor is unavailable to process the transaction due to an outage experienced by the first issuer processor, and wherein detecting that the first issuer processor is unavailable to process the transaction comprises receiving an indication from the first issuer processor that the first issuer processor is unavailable to process the transaction.

\* \* \* \* \*